(12) United States Patent
Qiu et al.

(10) Patent No.: US 12,197,345 B2
(45) Date of Patent: Jan. 14, 2025

(54) DATA PROCESSING METHOD AND NVMe STORAGE DEVICE

(71) Applicant: HUAWEI TECHNOLOGIES CO., LTD., Shenzhen (CN)

(72) Inventors: Xin Qiu, Shenzhen (CN); Huifeng Xu, Shenzhen (CN); Haitao Guo, Hangzhou (CN); Hongguang Liu, Hangzhou (CN); Huawei Liu, Shenzhen (CN); Chunyi Tan, Chengdu (CN); Victor Gissin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 131 days.

(21) Appl. No.: 17/947,812

(22) Filed: Sep. 19, 2022

(65) Prior Publication Data

US 2023/0011387 A1 Jan. 12, 2023

Related U.S. Application Data

(63) Continuation of application No. 16/899,294, filed on Jun. 11, 2020, now Pat. No. 11,467,975, which is a
(Continued)

(30) Foreign Application Priority Data

Dec. 28, 2015 (CN) .......................... 201510998928.8

(51) Int. Cl.
*G06F 12/10* (2016.01)
*G06F 3/06* (2006.01)
(Continued)

(52) U.S. Cl.
CPC .......... *G06F 12/1009* (2013.01); *G06F 3/061* (2013.01); *G06F 3/0655* (2013.01);
(Continued)

(58) Field of Classification Search
CPC .... G06F 12/1009; G06F 3/061; G06F 3/0655; G06F 3/0679; G06F 3/0688;
(Continued)

(56) References Cited

U.S. PATENT DOCUMENTS 6,415,338 B1   7/2002   Habot
2006/0095670 A1   5/2006   Behrendt et al.
(Continued)

FOREIGN PATENT DOCUMENTS

CN   1832041 A   9/2006
CN   102436420 A   5/2012
(Continued)

OTHER PUBLICATIONS

"NVM Express, Management Interface," Revision 1.0, XP55877983A, pp. 1-96, NVM Express, Inc. (Nov. 17, 2015).
(Continued)

*Primary Examiner* — Jae U Yu
(74) *Attorney, Agent, or Firm* — Leydig, Voit & Mayer, Ltd.

(57) ABSTRACT

A data processing method and a storage apparatus are disclosed. The data processing method includes: receiving, by an NVMe storage device, an NVMe write command sent by a host, where the NVMe write command carries a key and a value pointer, the value pointer points to first storage space, and the first storage space is used to store a value; obtaining, by the NVMe storage device, the key from the NVMe write command and a value length, and allocating second storage space to the value according to the value length, where the second storage space is in the NVMe storage device; and obtaining, by the NVMe storage device, the value from the host, and storing the value in the second storage space.

11 Claims, 15 Drawing Sheets

Related U.S. Application Data continuation of application No. 15/971,990, filed on May 4, 2018, now Pat. No. 10,705,974, which is a continuation of application No. PCT/CN2016/103268, filed on Oct. 25, 2016.

(51) Int. Cl.
*G06F 12/1009* (2016.01)
*G06F 13/16* (2006.01)
*G06F 13/28* (2006.01)
*G06F 15/173* (2006.01)

(52) U.S. Cl.
CPC .......... *G06F 3/0679* (2013.01); *G06F 3/0688* (2013.01); *G06F 13/1668* (2013.01); *G06F 13/28* (2013.01); *G06F 15/17331* (2013.01); *G06F 2212/7201* (2013.01); *G06F 2213/0026* (2013.01)

(58) Field of Classification Search
CPC ................. G06F 13/1668; G06F 13/28; G06F 15/17331; G06F 2212/7201; G06F 2213/0026
See application file for complete search history.

(56) References Cited

U.S. PATENT DOCUMENTS

| | | | |
|---|---|---|---|
| 2012/0072656 A1* | 3/2012 | Archak | G06F 16/134 711/104 |
| 2013/0042055 A1 | 2/2013 | Kinoshita et al. | |
| 2013/0086311 A1 | 4/2013 | Huang et al. | |
| 2013/0191590 A1* | 7/2013 | Malwankar | G06F 13/1668 711/E12.019 |
| 2015/0261434 A1 | 9/2015 | Kagan et al. | |
| 2015/0331619 A1 | 11/2015 | Zheng et al. | |
| 2015/0370700 A1 | 12/2015 | Sabol et al. | |
| 2016/0099810 A1 | 4/2016 | Li et al. | |
| 2016/0232169 A1 | 8/2016 | Archak et al. | |
| 2018/0210970 A1 | 7/2018 | Marukame et al. | |

FOREIGN PATENT DOCUMENTS

| | | |
|---|---|---|
| CN | 102594849 A | 7/2012 |
| CN | 102929793 A | 2/2013 |
| CN | 103973810 A | 8/2014 |
| CN | 104238963 A | 12/2014 |
| CN | 104461380 A | 3/2015 |
| JP | 2014063540 A | 4/2014 |
| WO | 2014089828 A1 | 6/2014 |
| WO | 2014209764 A1 | 12/2014 |
| WO | 2015136612 A1 | 9/2015 |

OTHER PUBLICATIONS

"NVM Express Revision 1.2," XP055375092, pp. 1-205, NVM Express, Inc. (Nov. 3, 2014).
U.S. Appl. No. 16/899,294, filed Jun. 11, 2020.
U.S. Appl. No. 15/971,990, filed May 4, 2018.

* cited by examiner

| Common header |
|---|
| KV format ID |
| Key 1 length |
| Key 1 |
| Value 1 length |
| Value 1 |
| Metadata 1 length |
| Metadata 1 |
| Key 2 length |
| Key 2 |
| Value 2 length |
| Value 2 |
| Metadata 2 length |
| Metadata 2 |

FIG. 2

| Common header |
|ND format ID |
| Key 1 length |
| Key 1 |
| Value 1 length |
| Value 1 |
| Metadata 1 length |
| Metadata 1 |
| Key 2 length |
| Key 2 |
| Value 2 length |
| Value 2 |
| Metadata 2 length |
| Metadata 2 |

FIG. 4

| Key | Start address of value storage space | Value length | Start address of metadata storage space | Metadata length |
|---|---|---|---|---|
| Key 1 | Address 1 | Length 1 | Address 2 | Length 2 |
| Key 2 | Address 3 | Length 3 | Address 4 | Length 4 |
| Key 3 | Address 5 | Length 5 | Address 6 | Length 6 |
| ... | ... | ... | ... | ... |

DATA PROCESSING METHOD AND NVMe STORAGE DEVICE

CROSS-REFERENCE TO RELATED APPLICATION

This application is a continuation of U.S. patent application Ser. No. 16/899,294, filed on Jun. 11, 2020, which is a continuation of U.S. patent application Ser. No. 15/971,990, filed on May 4, 2018, now U.S. Pat. No. 10,705,974, which is a continuation of International Application No. PCT/CN2016/103268, filed on Oct. 25, 2016, which claims priority to Chinese Patent Application No. 201510998928.8, filed on Dec. 28, 2015. All of the aforementioned patent applications are hereby incorporated by reference in their entireties.

TECHNICAL FIELD

Embodiments of the present disclosure relate to the storage field, and in particular, to the NVMe field.

BACKGROUND

The NVMe (non-volatile memory express) protocol is a high-speed interface protocol used in a storage system. Compared with the SCSI protocol, the NVMe protocol provides a higher read/write speed and a lower delay, and therefore, attracts more attention of the industry and becomes increasingly popular.

With development of information technologies, an object storage technology is frequently used. A common object storage technology is key value (KV) storage. In the prior art, because an NVMe device supports only a block interface, if a host needs to store KV data in an NVMe storage device, steps are as follows: The host needs to convert a KV command (generally, including a key, a value, and metadata) into a data block (for example, the host splits one KV command into at least two data blocks, or combines KV commands into one data block). The host allocates an LBA address to the data block. The host sends the data block to the NVMe storage device. After receiving the data block, the NVMe storage device successively stores data blocks according to the allocated LBA address.

However, in the foregoing steps, converting the KV data into the data block and allocating the LBA address to the data block consume a large quantity of computing resources of the host. Consequently, performance of the storage system deteriorates, and running efficiency of the host and a storage controller is affected.

SUMMARY

The present disclosure provides solutions to a data processing method, an NVMe storage device, and a storage system, so that efficiency of writing KV data into an NVMe storage device can be improved. In some solutions, correspondingly, efficiency of reading the KV data from the NVMe storage device is also improved.

A first aspect of embodiments of the present disclosure provides a data processing method. The method includes: receiving, by a non-volatile memory express NVMe storage device, an NVMe write command sent by a host, where the NVMe write command carries a key, the NVMe write command carries a value pointer, the value pointer points to first storage space in the host, the first storage space is used to store a value, and the key and the value belong to a same KV pair; obtaining, by the NVMe storage device, the key from the NVMe write command, obtaining a value length according to the value pointer, and allocating second storage space to the value according to the value length, where the second storage space is in the NVMe storage device; and sending, by the NVMe storage device, a first transmission request to the host, obtaining the value from the host, and storing the value in the second storage space. Based on this solution, in a process of transmitting KV data from the host to the NVMe storage device, the KV data does not need to be converted into a block form, so that KV data storage efficiency is improved.

In a first possible implementation of the first aspect, the sending, by the NVMe storage device, a first transmission request to the host and obtaining the value from the host specifically includes: sending, by the NVMe storage device, a DMA transmission request to the host, and obtaining the value from the host, where the DMA instruction carries the first storage space as an access address, and carries the second storage space as a write address, where the NVMe storage device and the host are connected by using a PCIe bus. This solution provides a value transmission manner implemented in a DMA manner.

In a second possible implementation of the first aspect, the sending, by the NVMe storage device, a first transmission request to the host and obtaining the value from the host specifically includes: sending, by the storage device, an RDMA transmission request to the host, and obtaining the value from the host, where the RDMA instruction carries the first storage space as an access address, and carries the second storage space as a write address, where the NVMe storage device and the host are connected by using a Fabric bus. This solution provides a value transmission manner implemented in an RDMA manner.

In a third possible implementation of the first aspect, the NVMe write command further carries a KV quantity field, where the KV quantity field is used to describe a quantity of KVs in the NVMe write command, so that the NVMe storage device obtains, from the NVMe write command, keys whose quantity is the same as the quantity of KVs, and obtains values whose quantity is the same as the quantity of KVs. In this solution, a plurality of KVs may be carried in a same NVMe write command.

In a fourth possible implementation of the first aspect, the NVMe write command further carries a KV format field, where the KV format field describes a field structure in the NVMe write command, so that the NVMe storage device obtains each field from the NVMe write command according to field content defined by the KV format field. In this solution, a same NVMe device may be enabled to support multiple formats of NVMe write command packets for transmitting the KV. In a specific write operation process, a write command in one of the multiple formats is used. Similarly, in a process of a read command, a same NVMe device may also be enabled to support multiple formats of NVMe read command packets for transmitting the KV.

In a fifth possible implementation of the first aspect, the NVMe write command further carries the value metadata pointer, and the method further includes: obtaining, by the NVMe storage device, a metadata length according to the metadata pointer, and allocating fourth storage space to the metadata according to the metadata length, where the fourth storage space is in the NVMe storage device; and obtaining, by the NVMe storage device, the metadata from the host by using the first transmission request, and storing the metadata in the fourth storage space. A specific solution of storing the metadata in the KV is described in this solution.

With reference to the fifth possible implementation of the first aspect, in a sixth possible implementation, the method includes: after the metadata fails to be transmitted, releasing, by the NVMe storage device, the storage space allocated to the value, and releasing the fourth storage space allocated to the metadata. In this solution, a resource occupied by the value may be released in a timely manner after the metadata fails to be transmitted.

In a seventh possible implementation of the first aspect, the sending, by the NVMe storage device, a first transmission request to the host and obtaining the value from the host specifically includes one of the following: sending, by the storage device, at least two DMA transmission requests to the host, so as to obtain the value, where each DMA transmission request is used to request to obtain a part of the value, and when any DMA transmission request fails to be executed, releasing, by the NVMe storage device, the storage space allocated to the value, where the NVMe storage device and the host are connected by using a PCIe bus; or sending, by the storage device, at least two RDMA transmission requests to the host, so as to obtain the value, where each RDMA transmission request is used to request to obtain a part of the value, and when any RDMA transmission request fails to be executed, releasing, by the NVMe storage device, the storage space allocated to the value, where the NVMe storage device and the host are connected by using the Fabric. In this solution, a same value may be separately transmitted by using multiple RDMA transmission requests, so as to reduce an amount of data in each RDMA transmission.

In an eighth possible implementation of the first aspect, the method further includes: generating a mapping relationship between the key and the second storage space. The mapping relationship may provide a basis for a subsequent solution of reading the KV (especially the value).

In a ninth possible implementation of the first aspect, after the foregoing method, the method further includes: receiving, by the NVMe storage device, an NVMe read command from the host, where the NVMe read command carries the key. In addition, the method may further include: searching, by the NVMe storage device, the mapping relationship according to the key, obtaining location information of the second storage space in which the value is stored, and sending the location information of the second storage space to the host; and receiving, by the NVMe storage device, a second transmission request sent by the host, where the second transmission request is used to request to obtain data stored in the second storage space. According to the nine possible implementation of the first aspect, reading of the KV (or the value) may be implemented.

In a tenth possible implementation of the first aspect, before the receiving, by the NVMe storage device, a second transmission request sent by the host, the method further includes: reserving, by the host, third storage space in the host according to a size of the second storage space; and after the sending, by the NVMe storage device, the value to the host, the method further includes: writing, by the host, data received from the second storage space into the fourth storage space. Operations performed by the host in a process of reading the KV (or the value) are described in this solution.

In an eleventh possible implementation of the first aspect, the NVMe read command that is sent by the host and that is received by the NVMe storage device further carries free space information of the host, and after the receiving, by the NVMe storage device, an NVMe read command from the host, the method further includes: determining, by the NVMe storage device, whether free storage space in the host is greater than or equal to the second storage space; and if the free storage space in the host is greater than or equal to the second storage space, performing the step of sending the location information of the second storage space to the host, or if the free storage space in the host is not greater than or equal to the second storage space, ending the step. In this solution, the free space information of the host is carried in the NVMe read command, so that after receiving the response of the NVMe storage device, the NVMe storage device has informed of space information of the host, thus, the host does not need to determine whether the free space is enough or reserve storage space. This may reduce interaction times between the NVMe storage device and the host, thereby improving efficiency of reading the value by the host. It should be noted that free space herein means a space with contiguous address.

In a twelfth possible implementation of the first aspect, the first storage space is described by using a start address of the first storage space and the value length; and the second storage space is described by using a start address of the second storage space. A description manner of the storage space is described in this solution. According to content described in this description manner, a storage location from which the value is read and a storage location into which the value is written may be located.

According to a second aspect, the present disclosure provides an implementation of an NVMe storage device. The NVMe storage device includes a controller and a storage medium, where the controller is connected to the storage medium, and the storage medium is configured to provide storage space, where the processor is configured to: receive, a non-volatile memory express NVMe write command sent by a host, where the NVMe write command carries a key, the NVMe write command carries a value pointer, the value pointer points to first storage space in the host, the first storage space is used to store a value, and the key and the value belong to a same KV pair; obtain the key from the NVMe write command, obtain a value length according to the value pointer, and allocate second storage space to the value according to the value length, where the second storage space is in the storage medium; and send a first transmission request to the host, obtain the value from the host, and store the value in the second storage space. The NVMe storage device is configured to perform methods in the first aspect and in various implementations of the first aspect.

A third aspect of the present disclosure provides an implementation method for a data processing method. The method includes: receiving, by a non-volatile memory express NVMe storage device, an NVMe write command, where a header of the NVMe write command carries a key key, the NVMe command further carries a value value, the key is corresponding to the value, and the key and the value belong to a same KV pair; obtaining, by the NVMe storage device, the key and the value from the NVMe write command; and storing, by the NVMe storage device, the value in a storage medium in the NVMe storage device.

In a first possible implementation of the third aspect, the NVMe write command further carries a KV quantity field, where the KV quantity field is used to describe a quantity of KVs in the NVMe write command, so that the NVMe storage device obtains, from the NVMe write command, keys whose quantity is the same as the quantity of KVs, and obtains values whose quantity is the same as the quantity of KVs.

In a second possible implementation of the third aspect, the NVMe write command further carries a KV format field, where the KV format field describes a field structure in the NVMe write command, so that the NVMe storage device obtains each field from the NVMe write command according to field content defined by the KV format field.

In a third possible implementation of the third aspect, the NVMe write command further carries a key length, and the obtaining, by the NVMe storage device, the key from the write command specifically includes: obtaining the key from the write command from a preset start location of the key and according to the key length.

In a fourth possible implementation of the third aspect, the NVMe write command further carries a value offset and a value length, where the obtaining, by the NVMe storage device, the value from the NVMe write command specifically includes: obtaining, by the NVMe storage device according to the value length, the value from a location indicated by the offset.

In a fifth possible implementation of the third aspect, the method further includes: generating a mapping relationship between the key and the value storage space.

A six possible implementation is based on the fifth possible implementation of the third aspect of this application. After the foregoing method, the method further includes: sending, by a host, an NVMe read command to the NVMe storage device, where the NVMe read command carries the key; receiving, by the NVMe storage device, the read command from the host, and obtaining the key from the NVMe read command; searching, by the NVMe storage device and by using the key, the mapping relationship for the value storage space; obtaining, by the NVMe storage device, the value from the value storage space; and generating, by the NVMe storage device, a response message of the NVMe read command, and sending the response message to the host, where the response message carries the value.

According to a fourth aspect, the present disclosure provides an implementation of an NVMe storage device. The NVMe storage device includes a controller and a storage medium. The controller is configured to perform methods in the third aspect and in various implementations of the third aspect.

A fifth aspect of the embodiments of the present disclosure provides a storage apparatus. The storage apparatus may be a physical device, for example, an NVMe storage device; or may be a logical device, for example, a program running on a processor in an NVMe storage device, or a program in a storage server. The apparatus includes: an interface module, configured to receive an NVMe write command sent by a host, where the NVMe write command carries a key, the NVMe write command carries a value pointer, the value pointer points to first storage space in the host, the first storage space is used to store a value, and the key and the value belong to a same KV pair; a processing module, configured to: obtain the key from the NVMe write command, obtain a value length according to the value pointer, and allocate second storage space to the value according to the value length; and a storage module, configured to: send a first transmission request to the host, obtain the value from the host, and store the value in the second storage space. The second storage space may be provided by a storage medium in the NVMe storage device. The storage medium is connected to a processor in the NVMe storage device. Based on this solution, in a process of transmitting KV data from the host to the NVMe storage device, the KV data does not need to be converted into a block form, so that KV data storage efficiency is improved.

In a first possible implementation of the fifth aspect, that the storage module sends a first transmission request to the host and obtains the value from the host specifically includes: sending, by the storage module, a DMA transmission request to the host, and obtaining the value from the host, where the DMA instruction carries the first storage space as an access address, and carries the second storage space as a write address. The storage apparatus (the storage apparatus is hardware) and the host are connected by using a PCIe bus, or the NVMe storage device in which the storage apparatus (the storage apparatus is software) is located and the host are connected by using a PCIe bus. This solution provides a value transmission manner implemented in a DMA manner.

In a second possible implementation of the fifth aspect, that the storage module sends a first transmission request to the host and obtains the value from the host specifically includes: sending, by the storage module, an RDMA transmission request to the host, and obtaining the value from the host, where the RDMA instruction carries the first storage space as an access address, and carries the second storage space as a write address. The storage apparatus (the apparatus is hardware) and the host are connected by using a Fabric bus, or the NVMe storage device in which the storage apparatus (the storage apparatus is software) is located and the host are connected by using a Fabric bus. This solution provides a value transmission manner implemented in an RDMA manner.

In a third possible implementation of the fifth aspect, the NVMe write command further carries a KV quantity field, where the KV quantity field is used to describe a quantity of KVs in the NVMe write command, so that the NVMe storage device obtains, from the NVMe write command, keys whose quantity is the same as the quantity of KVs, and obtains values whose quantity is the same as the quantity of KVs. In this solution, a plurality of KVs may be carried in a same NVMe write command.

In a fourth possible implementation of the fifth aspect, the NVMe write command further carries a KV format field, where the KV format field describes a field structure in the NVMe write command, so that the NVMe storage device obtains each field from the NVMe write command according to field content defined by the KV format field. In this solution, a same NVMe device may be enabled to support multiple formats of NVMe write command packets for transmitting the KV. In a specific write operation process, a write command in one of the multiple formats is used. Similarly, in a process of a read command, a same NVMe device may also be enabled to support multiple formats of NVMe read command packets for transmitting the KV.

In a fifth possible implementation of the fifth aspect, the NVMe write command further carries the value metadata pointer, and the method further includes: obtaining, by the NVMe storage device, a metadata length according to the metadata pointer, and allocating fourth storage space to the metadata according to the metadata length, where the fourth storage space is in the NVMe storage device; and obtaining, by the NVMe storage device, the metadata from the host by using the first transmission request, and storing the metadata in the fourth storage space. A specific solution of storing the metadata in the KV is described in this solution.

With reference to the fifth possible implementation of the fifth aspect, in a sixth possible implementation, after the metadata fails to be transmitted, the processing module is further configured to: release the storage space allocated to the value, and release the fourth storage space allocated to the metadata. In this solution, a resource occupied by the value may be released in a timely manner after the metadata fails to be transmitted.

In a seventh possible implementation of the fifth aspect, that the storage module sends a first transmission request to the host and obtains the value from the host specifically includes one of the following: sending, by the processing module, at least two DMA transmission requests to the host, so as to obtain the value, where each DMA transmission request is used to request to obtain a part of the value, and when any DMA transmission request fails to be executed, releasing, by the storage module, the storage space allocated to the value, where the NVMe storage device and the host are connected by using a PCIe bus; or sending, by the storage module, at least two RDMA transmission requests to the host, so as to obtain the value, where each RDMA transmission request is used to request to obtain a part of the value, and when any RDMA transmission request fails to be executed, releasing, by the storage module, the storage space allocated to the value, where the NVMe storage device and the host are connected by using the Fabric. In this solution, a same value may be separately transmitted by using multiple RDMA transmission requests, so as to reduce an amount of data in each RDMA transmission.

In an eighth possible implementation of the fifth aspect, the processing module is further configured to generate a mapping relationship between the key and the second storage space. The mapping relationship may provide a basis for a subsequent solution of reading the KV (especially the value).

In a ninth possible implementation of the fifth aspect, the interface module is further configured to receive an NVMe read command from the host, where the NVMe read command carries the key. The processing module is further configured to search the mapping relationship according to the key, obtain location information of the second storage space in which the value is stored, and the processing module is further configured to send the location information of the second storage space to the host by using the interface module. The interface module is further configured to receive a second transmission request sent by the host, where the second transmission request is used to request to obtain data stored in the second storage space. According to the eighth possible implementation of the fifth aspect, reading of the KV (or the value) may be implemented.

In a tenth possible implementation of the fifth aspect, before the interface module receives a second transmission request sent by the host, the host is further configured to reserve third storage space in the host according to a size of the second storage space. After the storage apparatus sends the value to the host, the host is further configured to write data received from the second storage space into the fourth storage space. A function of reading the KV (or the value) by the host is described in this solution.

In an eleventh possible implementation of the fifth aspect, the NVMe read command that is sent by the host and that is received by the interface module further carries free space information of the host, and after the receiving, by the NVMe storage device, an NVMe read command from the host, the method further includes: determining, by the NVMe storage device, whether free storage space in the host is greater than or equal to the second storage space; and if the free storage space in the host is greater than or equal to the second storage space, performing the step of sending the location information of the second storage space to the host, or if the free storage space in the host is not greater than or equal to the second storage space, ending the step. In this solution, the free space information of the host is carried in the NVMe read command, so that after receiving the response of the NVMe storage device, the host does not need to determine whether the free space is enough or reserve storage space. This may reduce interaction times between the NVMe storage device and the host, thereby improving efficiency of reading the value by the host. It should be noted that free space herein means a contiguous address space.

In a twelfth possible implementation of the fifth aspect, the first storage space is described by using a start address of the first storage space and the value length; and the second storage space is described by using a start address of the second storage space. A description manner of the storage space is described in this solution. According to content described in this description manner, a storage location from which the value is read and a storage location into which the value is written may be located.

According to a sixth aspect, with reference to the storage apparatus provided in the fifth aspect and the possible implementations of the fifth aspect, the present disclosure further provides an implementation of a storage system. The storage system includes a host and a storage apparatus.

A seventh aspect of the present disclosure provides a storage apparatus. The storage apparatus may be a physical device, for example, an NVMe storage device; or may be a logical device, for example, a program running on a processor in an NVMe storage device, or a program in a storage server. The apparatus includes: an interface module, configured to receive an NVMe write command, where a header of the NVMe write command carries a key key, the NVMe command further carries a value value, the key is corresponding to the value, and the key and the value belong to a same KV pair; a processing module, configured to obtain the key and the value from the NVMe write command; and a storage module, configured to store the value in the storage medium in the NVMe storage device.

In a first possible implementation of the seventh aspect, the NVMe write command further carries a KV quantity field, where the KV quantity field is used to describe a quantity of KVs in the NVMe write command, so that the processing module obtains, from the NVMe write command, keys whose quantity is the same as the quantity of KVs, and obtains values whose quantity is the same as the quantity of KVs.

In a second possible implementation of the seventh aspect, the NVMe write command further carries a KV format field, where the KV format field describes a field structure in the NVMe write command, so that the processing module obtains each field from the NVMe write command according to field content defined by the KV format field.

In a third possible implementation of the seventh aspect, the NVMe write command further carries a key length, and that the processing module obtains the key from the write command specifically includes: obtaining the key from the write command from a preset start location of the key and according to the key length.

In a fourth possible implementation of the seventh aspect, the NVMe write command further carries a value offset and a value length, and that the processing module obtains the value from the NVMe write command specifically includes: obtaining, by the processing module according to the value length, the value from a location indicated by the offset.

In a fifth possible implementation of the seventh aspect, the storage module is further configured to generate a mapping relationship between the key and the value storage space.

Based on the fifth possible implementation of the seventh aspect, a seventh possible implementation provides an implementation of the host. The host is configured to send an NVMe read command to the NVMe storage device, where the NVMe read command carries the key. The interface module is further configured to: receive the read command from the host, and obtain the key from the NVMe read command. The processing module is further configured to search, by using the key, the mapping relationship for the value storage space; the processing module is further configured to obtain the value from the value storage space; and the processing module is further configured to: generate a response message of the NVMe read command, and send the response message to the host by using the interface module, where the response message carries the value.

According to an eighth aspect, with reference to the storage apparatus provided in the seventh aspect and the possible implementations of the seventh aspect, the present disclosure further provides an implementation of a storage system. The storage system includes a host and a storage apparatus.

According to a ninth aspect, with reference to the storage device provided in the second aspect and the possible implementations of the second aspect, the present disclosure further provides an implementation of a storage system. The storage system includes a host and an NVMe storage device.

According to a tenth aspect, with reference to the storage device provided in the fourth aspect and the possible implementations of the fourth aspect, the present disclosure further provides an implementation of a storage system. The storage system includes a host and a storage apparatus.

Based on the solutions to the data processing method, the NVMe storage device, and the storage system that are provided in the present disclosure, efficiency of writing KV data into an NVMe storage device can be improved.

BRIEF DESCRIPTION OF DRAWINGS

FIG. 2 is a schematic diagram of an NVMe command format;

FIG. 4 is a schematic diagram of an NVMe command format;

DESCRIPTION OF EMBODIMENTS

Figure 1:
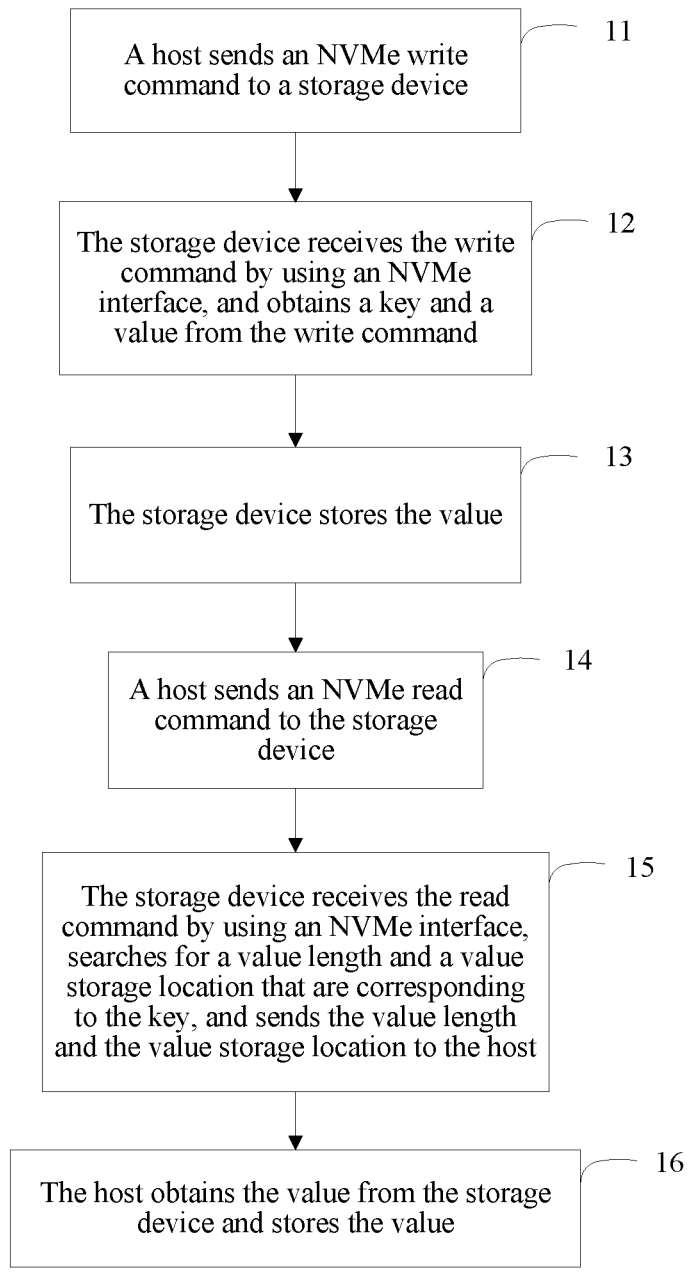
FIG. 1 is a flowchart of an embodiment of a data processing method.

Non-volatile memory express (NVMe) is a logical device interface, and may support accessing a non-volatile storage medium by using a PCIe bus. The NVMe interface may be used on a storage device of a flash medium, for example, a solid state disk SSD. A device with an NVMe interface is referred to as an NVMe device. An NVMe storage device is a type of NVMe device, and refers to an NVMe device having a storage function. The following mainly uses the NVMe storage device (in embodiments of the present disclosure, the NVMe storage device is referred to as a storage device for short) as an example for description.

KV storage, also referred to as K/V storage, is a storage technology. In the KV storage, a key-value pair is a basic data model. The key-value pair may include a key and a value. After being extended, the key-value pair may further include metadata. A key uniquely identifies a value.

If a host sends KV data to the NVMe storage device in a block manner for storage, operations that need to be performed by the host include: first converting the KV data into a block form; then allocating a logical block address (LBA) on the storage device to a block; and next, generating a write command, where the write command carries the block and the LBA of the block; and after receiving the block, storing, by the NVMe storage device, the block according to a physical address corresponding to the LBA. If the KV data needs to be read, a data block needs to be read first, and then the data block needs to be converted into the KV data. In a process of writing the KV data, allocating the LBA address and converting the KV data into the data block need to consume a lot of time and system resources that are of the host, increasing a system delay. In a process of reading the KV data, the host needs to send location information (for example, a start address and a length) of a to-be-read block to the NVMe storage device, obtain the data block, and re-convert the data block into the KV data. This also consumes a large quantity of computing resources of the host, increasing a system delay.

This application is applicable to an NVMe scenario and an NVMe over Fabric (NOF) scenario. In the NVMe scenario, a host and a storage device are connected by using a bus (for example, a PCIe bus). In this scenario, the storage device is used as a component of the host. For example, the host is a server, and the storage device is an NVMe interface solid state disk (SSD) in the server. In the NOF scenario, a host and a storage device are connected by using the Fabric (for example, the Ethernet or the FC). The host includes a memory, a processor, and an interface. The host and the storage device may be two devices independent of each other. In the embodiments of the present disclosure, the host is an initiator of a read request or a write request, and the storage device is a responder of the data request or the write request and is also referred to as a target.

In the embodiments of the present disclosure, the existing NVMe protocol may be extended, and a new NVMe command is proposed. The new NVMe command is an extension and optimization of an existing NVMe command (for example, an NVMe command defined in the NVMe standard protocol 1.2.1, or an NVMe command defined in the NVMe over Fabric standard protocol 1.0), so that an NVMe device may directly support a KV interface.

Because the NVMe device may directly support the KV interface, the KV data may be directly transmitted between the storage device and the host by using the NVMe protocol. The host may directly write the KV data into the storage device by using the NVMe protocol, or directly read the KV from the storage device by using the NVMe protocol. Therefore, compared with the prior art, repeated conversion between a KV format and a block format is avoided between the storage device and the host, thereby reducing system complexity and improving system performance. Unless otherwise specified, all NVMe commands in the embodiments of the present disclosure are extended NVMe commands.

In an optional implementation, a key is directly carried in a command header of the NVMe command. Therefore, the key may be obtained by directly reading the command header of the NVMe (with no need to parse a payload of the NVMe command).

A value may be carried in the NVMe command, and the value may be obtained by reading the NVMe command. In addition, alternatively, the NVMe command may not directly carry the value, but carries a value pointer. The value pointer directly or indirectly points to value storage space. The value may be obtained from the value storage space by using a DMA/an RDMA technology.

The following describes nouns that may appear in the embodiments of the present disclosure.

The following parameters are added to an existing NVMe write command; or a new NVMe KV write command is defined, and may include the following parameters.

Number of KV: a quantity of KVs transmitted in an NVMe command. A KV includes a key and a value corresponding to the key. Alternatively, a KV includes a key and a value pointer. The value pointer points to value storage space, and a value is corresponding to the key.

Value: data that may be stored in a storage device or read from the storage device, for example, a movie.

Key: uniquely identifies a value. The key may also be referred to as a key code. A combination of a key and a corresponding value may be referred to as a KV or a KV pair (pair).

KV (key value): a combination of a key and a value, also referred to as a KV pair. Optionally, the KV further includes metadata.

Metadata: used to describe an attribute of a value. For example, if a value is a movie, the metadata may include, but is not limited to, information such as a movie name, duration, or starring.

Common header: a part of a command header, referring to a part that is in the command header and that is the same as that in an existing NVMe command header.

KV format ID: indicates a format of a current NVMe command, or defines content of each field in the NVMe command. NVMe commands for transmitting a KV may be in multiple command formats, and are identified by using a KV format ID. NVMe packets in different command formats may have different fields, or different field arrangement orders.

Key length: describes a length of a key.
Value length: describes a length of a value.
Metadata length: describes a length of metadata.
Key offset: describes an offset of a key in an NVMe command.
Value offset: describes an offset of a value in an NVMe command.
Metadata offset: describes an offset of metadata in an NVMe command.
DPTR (Data Pointer): a data pointer, pointing to to-be-transmitted data.

MPTR (Metadata Pointer): a metadata pointer, pointing to to-be-transmitted metadata.

PRP (Physical Region Page) entry: a physical region page instance (or referred to as a physical region page format entry), which may be used to record a pointer. The PRP is one of two data transmission protocols frequently used in the NVMe protocol, and may be used for an NVMe over PCIe architecture. The PRP entry may point to a pointer of a physical memory page.

SGL (Scatter Gather List) Entry: a scatter gather list instance (or referred to as a scatter gather list format entry), which may be used to record a pointer. The SGL is one of the two data transmission protocols frequently used in the NVMe protocol, and may be used for an NVMe over PCIe/Fabric architecture.

Referring to FIG. 1, the present disclosure provides an embodiment of a data processing method. The method may be used between an NVMe storage device and a host.

11. A host generates an NVMe write command (hereinafter referred to as a write command for short), and sends the write command to a storage device, where the write command carries a value and a key corresponding to the value. The write command is sent to an NVMe storage device by using an NVMe interface on the host. The key and the value may be carried in a payload, or may be carried in a command header.

In this step, the key may be carried in the command header, or may be carried in the payload. In the embodiments of the present disclosure, unless otherwise stated, a field carried in a write command/a read command may be in a command header, or may be in a payload. For example, the value may be carried in the command header, or may be carried in the payload.

Optionally, if the write command carries more than one KV, the write command may further carry a "number of KV", so as to describe a quantity of KVs. After receiving the write command, the storage device may read the KV according to the quantity of KVs that is indicated by the number of KV, and stop reading after all KVs are read. Alternatively, a terminator may be used to indicate end of the KVs, and the storage device stops reading after reading the terminator.

Optionally, the write command further carries a KV format ID. NVMe commands for transmitting a KV may be in multiple command formats. For different command formats, fields may be different, and locations of the fields may also be different. The KV format ID is used to indicate a command format used by this command.

A location of the key in the command header of the write command may be unfixed, or may be a preset fixed location. If a location of the key in the write command is unfixed, the write command may further carry key location information. The key location information may be a combination of a key length and a key offset. The key offset describes a start location of the key in the write command. Alternatively, the key location information may be a combination of a start location of the key in the write command and an end location of the key in the write command. If the start location of the key in the write command is preset, the key location information may be a key length, and the key length describes a length of the key.

There are two solutions of presetting the start location of the key. One solution is presetting the location of the key in the command. For example, the key starts at the $20^{th}$ bit counting from the first bit of the command. The other solution is presetting a relative location between the key and another field. For example, a key field follows a key length field, and the key field and the key length field are adjacent.

Similarly, all "preset" locations used in this embodiment and another embodiment may be implemented by using the two solutions, for example, start locations of the value and metadata that are subsequently described in this embodiment.

The length of the key may be fixed or variable. That the length of the key is fixed means that key lengths in all commands are the same. That the length of the key is variable means that key lengths in different commands may be different. When the length of the key is fixed, a command receiver may ignore the location information (for example, the key length), or the write command may not carry the location information. After receiving the write command, the storage device directly reads the key according to a preset start location and according to a fixed length.

A location of the value in the write command may be fixed, or may be unfixed. If a location of the value in the write command is unfixed, the write command may further carry value location information. The value location information may be a value length. A start location of the value in the write command is preset, and therefore may not be carried in the write command. The value may be read from the write command from the start location of the value and by using the value length as a read length. The value location information may be a combination of the value length and a value offset. The value offset describes the start location of the value in the write command. Alternatively, the value location information may be a combination of the start location of the value in the write command and an end location of the value in the write command.

The length of the value may be fixed or variable. When the length of the value is fixed, a command receiver may ignore the location information (for example, the value length), or the write command may not carry the location information. The command receiver directly reads the value according to a preset start location and according to a fixed length.

Optionally, the write command further carries metadata of the value. The metadata may be carried in the command header of the write command or in the payload.

A location of the metadata in the write command may be fixed. If a location of the metadata in the write command is unfixed, the write command may further carry metadata location information. The metadata location information is similar to the value location information. Therefore, reference may be made to the description of the value location information. Details are not described herein again. Similarly, a length of the metadata may be fixed or variable.

Referring to FIG. 2, FIG. 2 shows an optional command format of a write command, where a common header is a part of an NVMe command header. The command carries two KVs, and therefore has two keys: a key 1 and a key 2; two values: a value 1 and a value 2; two key lengths: a key 1 length and a key 2 length; and two value lengths: a value 1 length and a value 2 length. In addition, the command further carries two pieces of metadata: metadata 1 and metadata 2; and a corresponding metadata length 1 and a corresponding metadata length 2.

Figure 3:
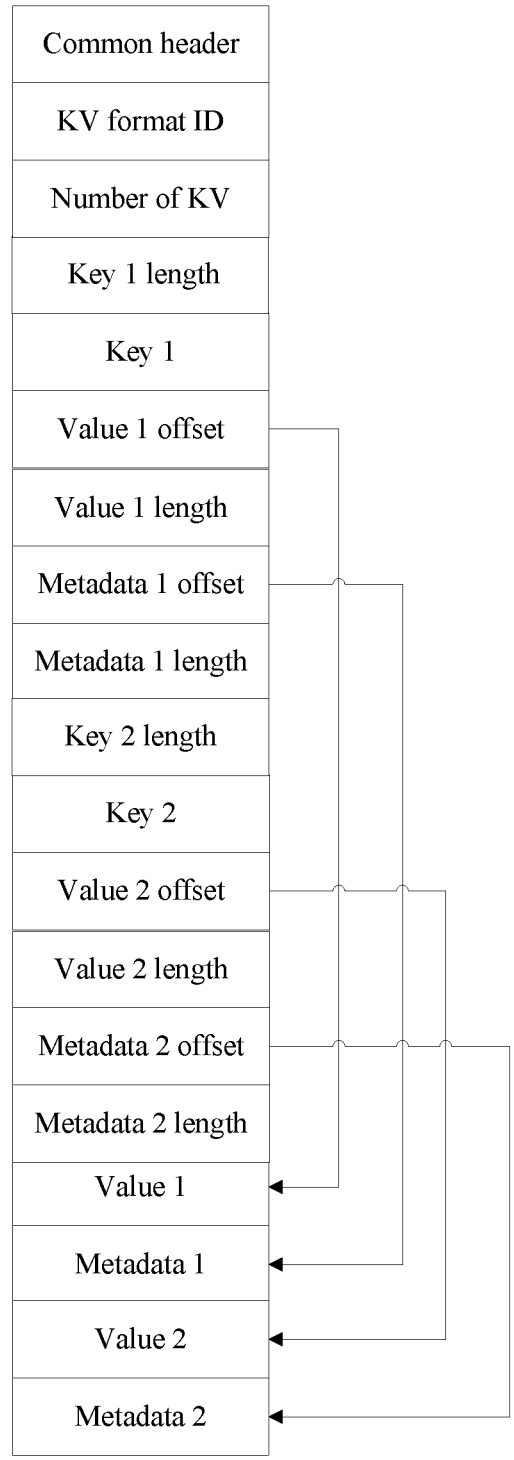
FIG. 3 is a schematic diagram of an NVMe command format.

Referring to FIG. 3, FIG. 3 is a schematic diagram of another NVMe command format. Compared with FIG. 2, FIG. 3 adds value location information (a value 1 offset and a value 2 offset) and metadata location information (a metadata 1 offset, a metadata 1 length, a metadata 2 offset, and a metadata 2 length), and further adds the number of KV. A command shown in FIG. 3 carries two KVs, and therefore a value of the number of KV is 2. Location information in the NVMe command describes a location of a field in the NVMe. Arrows used in FIG. 3 indicate that a location of to-be-written data (for example, a start location) may be found by using an offset. For example, after the value 1 offset field is read, a value of a value 1 offset field describes an offset of a value 1 in the command, and therefore the value 1 offset may be read. In the command format in FIG. 3, distribution of fields is determined according to a field type. Fields of a same type are adjacent to each other. For example, both the value and the metadata belong to are data, and therefore are adjacent; both the value location information and the metadata location information are location information, and therefore are adjacent.

Referring to FIG. 4, FIG. 4 is a schematic diagram of another NVMe command format. Compared with those in FIG. 3, fields are distributed according to a KV to which the fields belong, and fields of a same KV are adjacent. In the command format in FIG. 4, a field of a KV 1 comes before a field of a KV 2. In addition, in the command format in FIG. 4, a value and a value length are adjacent, and metadata and a metadata length are adjacent.

Figures 5, 6:
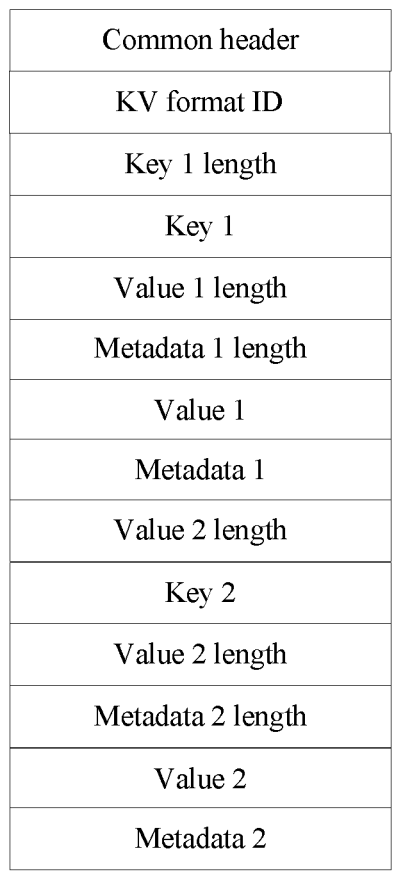
FIG. 5 is a schematic diagram of an NVMe command format.
FIG. 6 is a schematic diagram of a mapping relationship among a key, a value storage location, and a metadata storage location.

Referring to FIG. 5, FIG. 5 is a schematic diagram of another NVMe command format. In FIG. 5, fields of a same KV are adjacent. In addition, the value length and the metadata length are adjacent, and the value and the metadata are adjacent.

12. An NVMe interface on the storage device receives the write command. The storage device obtains the key and the value from the write command. If the write command carries metadata, the storage device further obtains the metadata from the write command.

The storage device includes a controller and a storage medium. The controller includes a processor, and optionally, may further include a memory. For example, the storage medium is a flash memory or a magnetic disk. Alternatively, the storage device may be a hard disk having a management capability, and is referred to as a smart hard disk.

If multiple NVMe command formats (for example, different NVMe command formats are shown in FIG. 2 and FIG. 3) are supported by a same storage device, the storage device may determine a specific format of a received command by using a KV format ID. Then, the storage device reads content such as a key or a value according to locations of fields such as the key and the value in this format. For different NVMe command formats, location relationships of data may be different. For example, in some formats, a location of a key is fixed; in some formats, a location of a key is unfixed, and is determined by key location information.

If the write command carries one KV, the KV is read. If the write command carries at least two KVs, the at least two KVs are read. The storage device may learn a quantity of KVs by using a number of KV field, and complete a read operation after reading a corresponding quantity of KVs. In addition to using the number of KV to identify a specific case in which the read operation is completed, a terminator may also be added to the command. After the terminator is read, it indicates that all KVs in the command are read.

If the location of the key is fixed, the storage device reads the key by using the fixed location. If the location of the key is unfixed, the storage device reads the key from the write command according to the key location information. For example, the key location information is the key length, and a start location of the key in the write command is preset, and the storage device continuously reads data from the start location of the key and by using the key length as a read length, so that the key carried in the write command may be obtained. For example, key location information is a combination of a key length and a key offset, the storage device continuously reads data by using the key offset as a start location of the key and by using the key length as a read length, so that the key carried in a write command may be obtained. For example, if the key location information is formed by a start location and an end location, the key may be obtained by reading data between the start location and the end location.

For manners of reading the value and the metadata, refer to the manner of reading the key. Details are not described herein again. When reading the key/the value/the metadata, the storage device may further obtain the key length/value length/metadata length.

Using the command format in FIG. 2 as an example, lengths of a command header field, a KV format ID field, a key length field, and a value length field are fixed, and a relative location of each field is also fixed. Therefore, a start location of the key or value may not need to be determined by using a field such a key offset or a value offset. The storage device reads fields of the write command in this order: reading the command header; reading the KV format ID; reading the key 1 length; reading the key 1 according to a recorded value of the key 1 length; reading the value 1 length; reading the value 1 according to the value 1 length; reading the key 2 length; reading the key 2 according to the key 2 length; reading the value 2 length; and reading the value 2 according to the value 2 length.

13. The storage device stores the value. Specifically, a controller in the storage device stores the key and the value in a non-volatile storage medium. After receiving the value, the interface on the storage device first sends the value to a processor. In this step, the processor temporarily stores the value in a memory, and then delivers the value to the non-volatile storage medium from the memory.

In addition, the storage device may further record a mapping relationship between the key and the value storage space. The mapping relationship may be stored in the storage medium in the storage device, or may be sent to a host and stored in the host. An example in which the mapping relationship is stored in the storage device is used as an example in the following.

If the write command further carries the metadata, the metadata is also stored, and a mapping relationship between the key and metadata storage space is recorded.

The value storage space may be described by using a start address of the value storage space and the value length. The metadata storage space may include descriptions of a start address of the metadata storage space and the metadata data length. Referring to FIG. 6, FIG. 6 is a schematic diagram of a mapping relationship, including a mapping between the key and the start address of the value storage space, a mapping between the key and the value length, a mapping between the key and the start address of the metadata storage space, and a mapping between the key and the metadata length. A corresponding start address of the value storage space, a corresponding value length, a corresponding start address of the metadata storage space, and a corresponding metadata length may be found in the mapping relationship by using the key as an index. Content described in the schematic diagram shown in FIG. 6 is recorded in a KV management unit. If the lengths of the value and the metadata are fixed, the value length and the metadata length are optional.

The storage space may be a logical location or a physical location, provided that the controller in the storage device may read the value and the metadata from the storage medium by using the storage space.

The process of writing a KV is described in step 11 to step 13. Next, a process of reading a KV is described in step 14 to step 16. The two processes are independent of each other. The KV requested by a read command may be different from the KV written by using a write command.

14. A host generates an NVMe read command (hereinafter referred to as a read command for short), and sends the read command to the storage device. The read command carries the key. The key may be carried in a command header of the read command.

The host generating the read command and the host generating the write command may be a same host, or may be different hosts. For a command format of the read command, refer to the format of the write command in step 11 and FIG. 2. A read command includes a command header, a KV format ID, and a key. Optionally, a read command carries key location information. A read command may carry one key, or may carry at least two keys. When carrying at least two keys, the read command may carry a number of KV field, so as to describe a quantity of carried keys.

A read command may include neither a value field nor another field related to the value. In addition, a read command may include neither a metadata field nor another field related to the metadata.

15. The storage device receives the read command by using the NVMe interface, and obtains the key from the read command; searches a KV management unit stored in the storage device for value storage space corresponding to the key; and obtains the value from the value storage space, constructs a response message of the read command, and sends the response message to the host. The response message carries the value.

Referring to step 12, according to different command formats, manners of obtaining the key are slightly different. For example, the key may be obtained from a fixed location in the read command, or the key may be obtained from the write command according to location information carried in the read command.

Similarly, if the storage device stores metadata corresponding to the key, metadata storage space may be searched for by using a similar method, so as to obtain the metadata.

It should be noted that if the KV management unit is stored in the host, the value storage space is searched for in the host by using the key. A value storage space address is sent to the storage device. The storage device obtains the value by using the value storage space, and sends the value to the host.

16. The host receives and stores the value. For example, the value may be stored in a memory (for example, a cache) in the host, or stored in a non-volatile storage medium in the host.

In steps 11 to 16, both the value and the metadata are carried in the NVMe command, and conversion between a KV and a block is not required, thereby bringing about an advantage of being simple and quick. The read command does not need to carry a value LBA and/or a metadata LBA. Therefore, the value and/or the metadata can be read more quickly.

Figure 7:
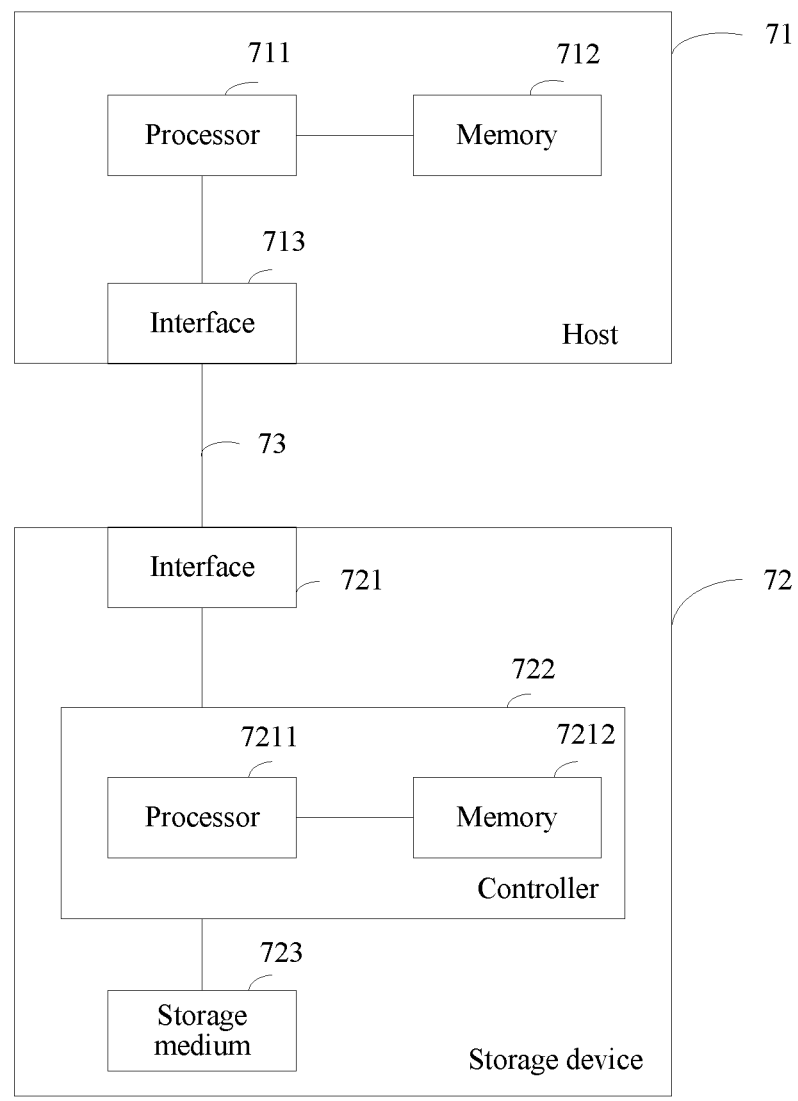
FIG. 7 is a topology view of an embodiment of a hardware topology of a data processing system.

Referring to FIG. 7, FIG. 7 shows an embodiment of a hardware topology of a data processing system in the present disclosure. A host 71 and a storage device 72 communicate with each other. The host 71 includes a processor 711, a memory 712, and an interface 713. The storage device 72 includes an interface 721, a controller 722, and a storage medium 723. The interface 713 and the interface 721 are connected by using a communications link 73. For example, the communications link 73 is a PCIe bus, the Fibre Channel FC, or the Ethernet.

Operations performed by the host 71 may be performed by the processor 711. For example, the processor 711 may perform steps 11, 14, and 16 by running a program in the memory 712. The memory 712 and the processor 711 are relatively independent of each other, or may be integrated. The storage device 72 includes a control area 722 and a storage medium 723. Operations performed by the storage device 72 are performed by the controller 722 in the storage device. Specifically, a processor 7211 may run a program in a memory 7212 to perform the operations of the storage device. For example, the processor in the storage device is configured to perform steps 12, 13, and 15. In some cases, for example, when the processor is an FPGA, there may be no memory, and the processor directly performs corresponding operations.

Similarly, same hardware is used in a subsequent method. A difference lies in that the host and the storage device are configured to perform different operations. For example, steps 21, 24, and 27 are performed by the host 71, and steps 23 and 25 are performed by the storage device 72. In steps 22 and 26, some operations are performed by the host 71, and the remaining operations are performed by the storage device 72.

Figure 8:
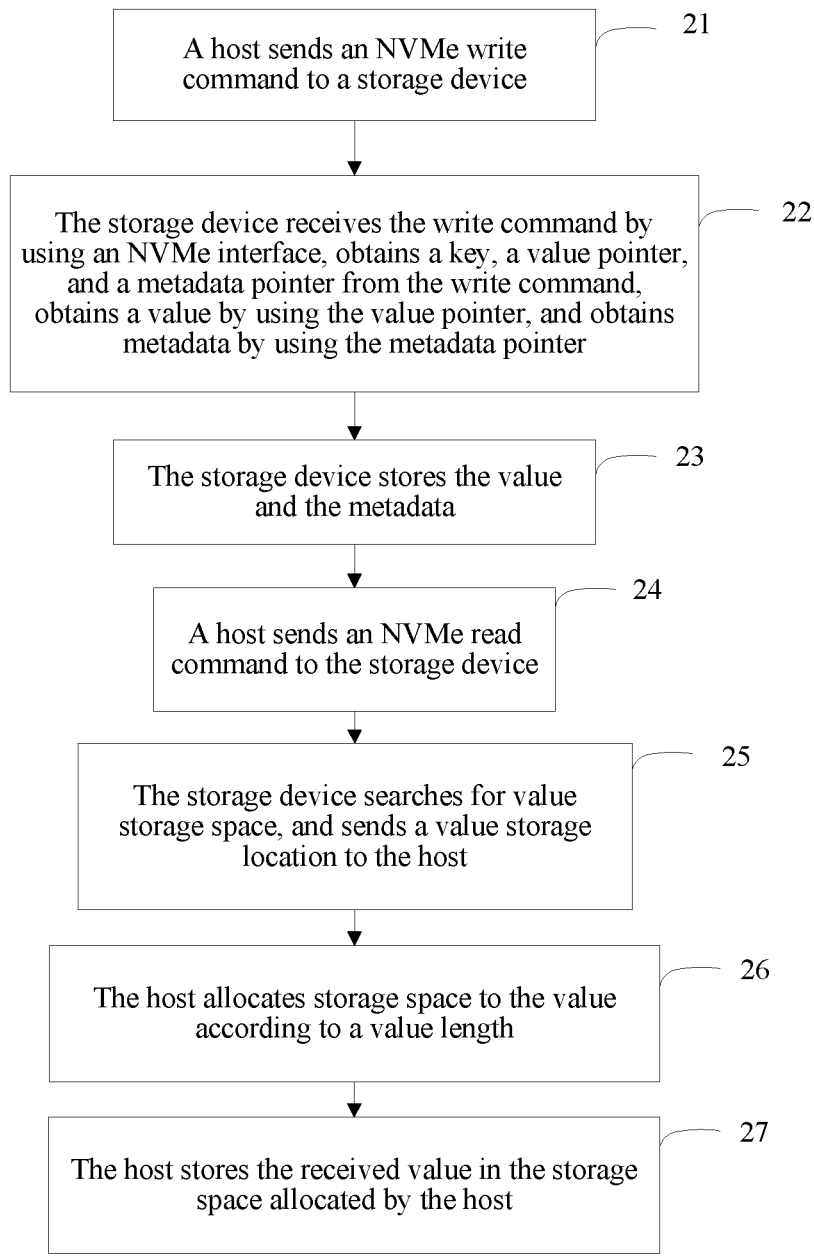
FIG. 8 is a flowchart of an embodiment of a data processing method.

Referring to FIG. 8, the present disclosure further provides an implementation. A write command does not directly carry a value or metadata, but the NVMe command carries a pointer. A to-be-written value and/or to-be-written metadata may be obtained by using storage space that is pointed to by the pointer. Alternatively, a multi-level pointer manner is used. A pointer points to another pointer, and the to-be-written value and/or the to-be-written metadata are/is obtained from storage space that is pointed to by the another pointer. This implementation imposes no limitation on a size of the to-be-written value and/or a size of the to-be-written metadata.

A host and a storage device may be connected by using an IP network, an FC network, or the like, and may run on a Fabric architecture, which is also referred to as an NOF (NVMe Over Fabric) architecture. In the NOF architecture, the storage device may obtain the value and/or the metadata in a remote direct memory access (RDMA) manner. If the storage device is inside the host, the storage device may further obtain the value and/or the metadata from the host in a direct memory access (DMA) manner. Similarly, the host may also directly obtain a value and/or metadata from the storage device in the RDMA/DMA manner.

Step 21: A host constructs a write command. The write command carries a KV. The KV includes a value pointer and a key of a value. The write command is sent to an NVMe storage device by using an NVMe interface on the host. The key and the value belong to a same KV pair.

The value pointer may be carried in a payload, or may be carried in a command header. Similarly, other data carried in a write command or a read command may be carried in a command header, or may be carried in a payload.

In another embodiment, a write command may also carry a key pointer instead of carrying a key. A principle of a obtaining the key according to the key pointer is the same as a principle of obtaining the value by using the value pointer. Therefore, details are not described in the following. Descriptions are merely made by using an example in which the write command carries the key.

The value pointer directly or indirectly points to value storage space (hereinafter also referred to as first storage space for ease of description), and therefore the value may be obtained by using the value pointer. When the value pointer points to the value storage space (this case is also considered as that the value pointer points to the value), the value may be obtained from the storage space that is pointed to by the value pointer. Another case is as follows: The value pointer points to a first pointer; and the first pointer points to the value storage space. The first pointer is found according to the value pointer, and the value may be obtained from the storage space that is pointed to by the first pointer. In the latter case, a value with a larger size may be carried. In another embodiment, reference between pointers may further have more levels, provided that the value storage space can be found finally. For example, the value pointer points to the first pointer, the first pointer points to an $A1^{th}$ pointer, the $A1^{th}$ pointer points to an $A2^{th}$ pointer, . . . , an $(AN-1)^{th}$ pointer points to an $AN^{th}$ pointer, and the $AN^{th}$ pointer points to the value storage space. N is an integer greater than or equal to 2. The value pointer may be carried in the command header of the write command or in the payload.

The first storage space may be described by using a start address of the first storage space and the value length, or may be described by using the start address and an end address that are of the first storage space. For example, the value pointer records the start address of the first storage space and the value length. Alternatively, the value pointer points to another pointer, and the another pointer records the start address of the first storage space and the value length. The first storage space may be a logical location or a physical location, provided that the storage device may read stored data from the storage medium by using the first storage space.

Optionally, if the write command carries more than one KV, the write command further carries a number of KV, so as to describe a quantity of KVs.

Optionally, the write command further carries a KV format ID. NVMe commands for transmitting a KV may be in multiple command formats. For different command formats, fields may be different, and locations of the fields may also be different. The KV format ID indicates a command format used by this command.

A location of the key in the command header of the write command may be unfixed, or may be a preset fixed location. For a feature of the key, refer to the description of the key in step 11. Details are not described herein again.

Optionally, the write command further carries a metadata pointer. Similar to the value pointer, the metadata pointer directly or indirectly points to metadata storage space. Therefore, metadata may be obtained by using the metadata pointer. The metadata pointer may be carried in the command header of the write command or in the payload.

Because metadata pointer directly or indirectly points to the metadata storage space, the metadata may be obtained by using the metadata pointer. When the metadata pointer directly points to the metadata (specifically, to the metadata storage space), the metadata may be obtained from the storage space that is pointed to by the metadata pointer. Another case is as follows: The metadata pointer points to a second pointer, and the second pointer points to the metadata storage space. The second pointer is found according to the metadata pointer; and the metadata may be obtained from the storage space that is pointed to by the second pointer. In the latter case, metadata with a larger size may be carried. In another embodiment, reference between pointers may further have more levels, provided that the metadata storage space can be found finally. For example, the metadata pointer points to the second pointer, the second pointer points to a $B1^{th}$ pointer, the $B1^{th}$ pointer points to a $B2^{th}$ pointer, ..., a $(BN-1)^{th}$ pointer points to a $BN^{th}$ pointer, and the $BN^{th}$ pointer points to the metadata storage space. N is an integer greater than or equal to 2.

In addition, the metadata may be transmitted without using the pointer, but be directly carried in the command. For details, refer to step 11 and the manners of carrying the metadata in FIG. 2 and FIG. 3.

The value pointer may be a data pointer (DPTR). The metadata pointer may be a metadata pointer (MPTR).

Figure 9:
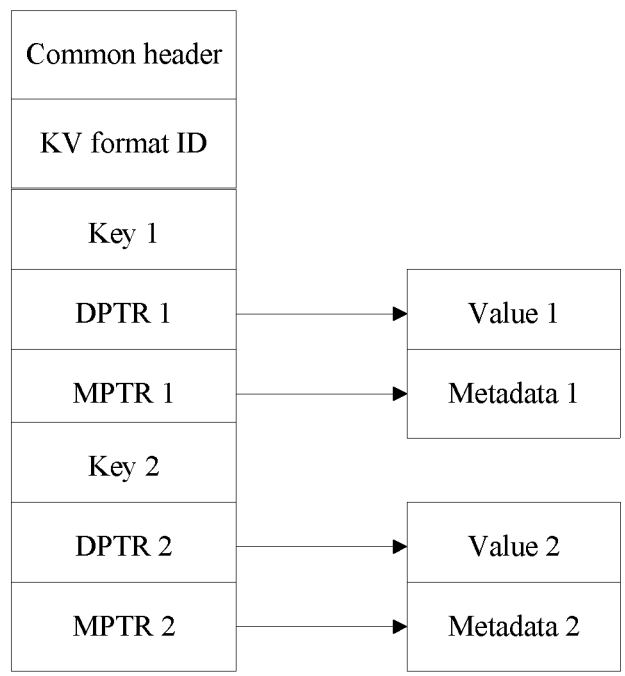
FIG. 9 is a schematic diagram of a command format.

Referring to FIG. 9, FIG. 9 is a diagram of a command format. A command in FIG. 9 carries two KVs. A key in the KV is directly carried in a write command. A value is carried in the write command in a pointer manner. There are a key 1 and a DPTR 1 (pointing to a value 1), and a key 2 and a DPTR 2 (pointing to a value 2). In addition, metadata of the two KVs is further carried in a pointer manner. An MPTR 1 points to metadata 1, and an MPTR 2 points to metadata 2. In this embodiment of the present disclosure, each command may carry one KV, or may carry at least two KVs.

Figure 10:
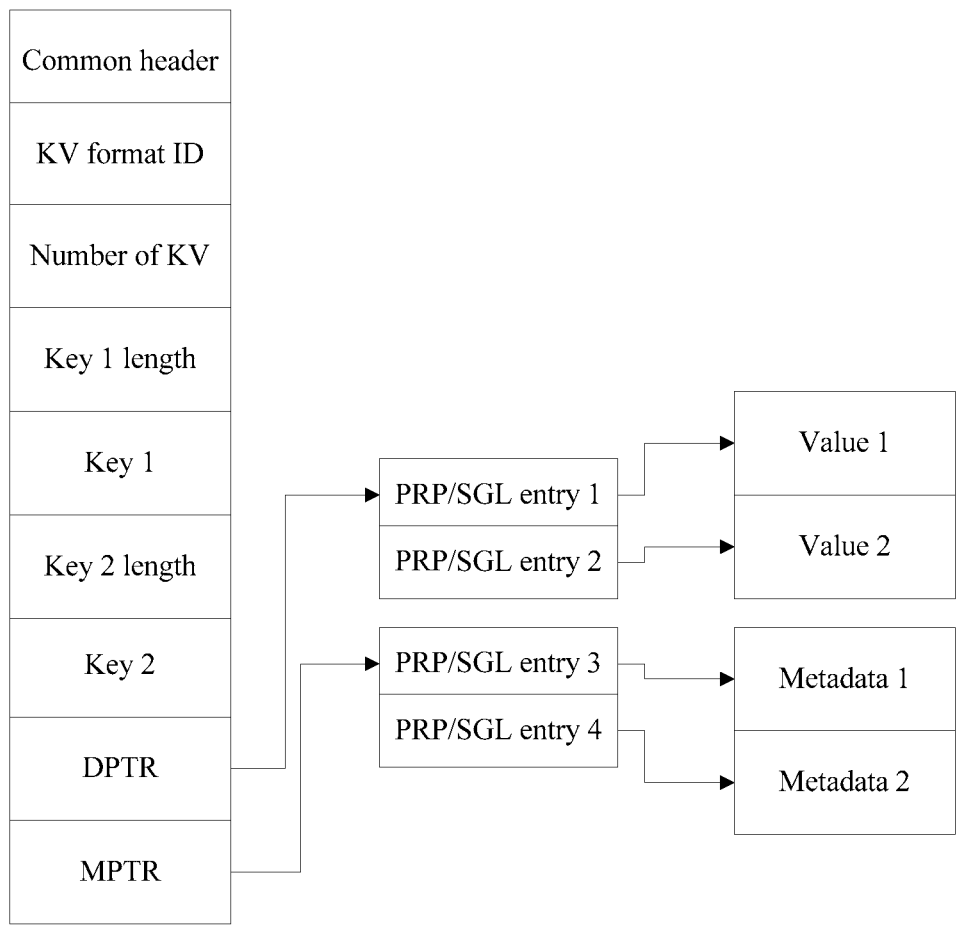
FIG. 10 is a schematic diagram of a command format.

Referring to FIG. 10, FIG. 10 is a diagram of another command format. A pointer (DPTR or MPTR) in a command does not directly point to a value or metadata, but points to a PRP entry or an SGL entry. The PRP entry or the SGL entry is a node in a linked list. Each PRP/SGL entry points to another address. A value or metadata is stored in the address that is pointed to by the PRP/SGL entry. That is, a write command points to a value or metadata in a second-level pointer manner. In the solution in FIG. 10, a key is carried in a command, and specifically, is carried in a command header.

Figure 11:
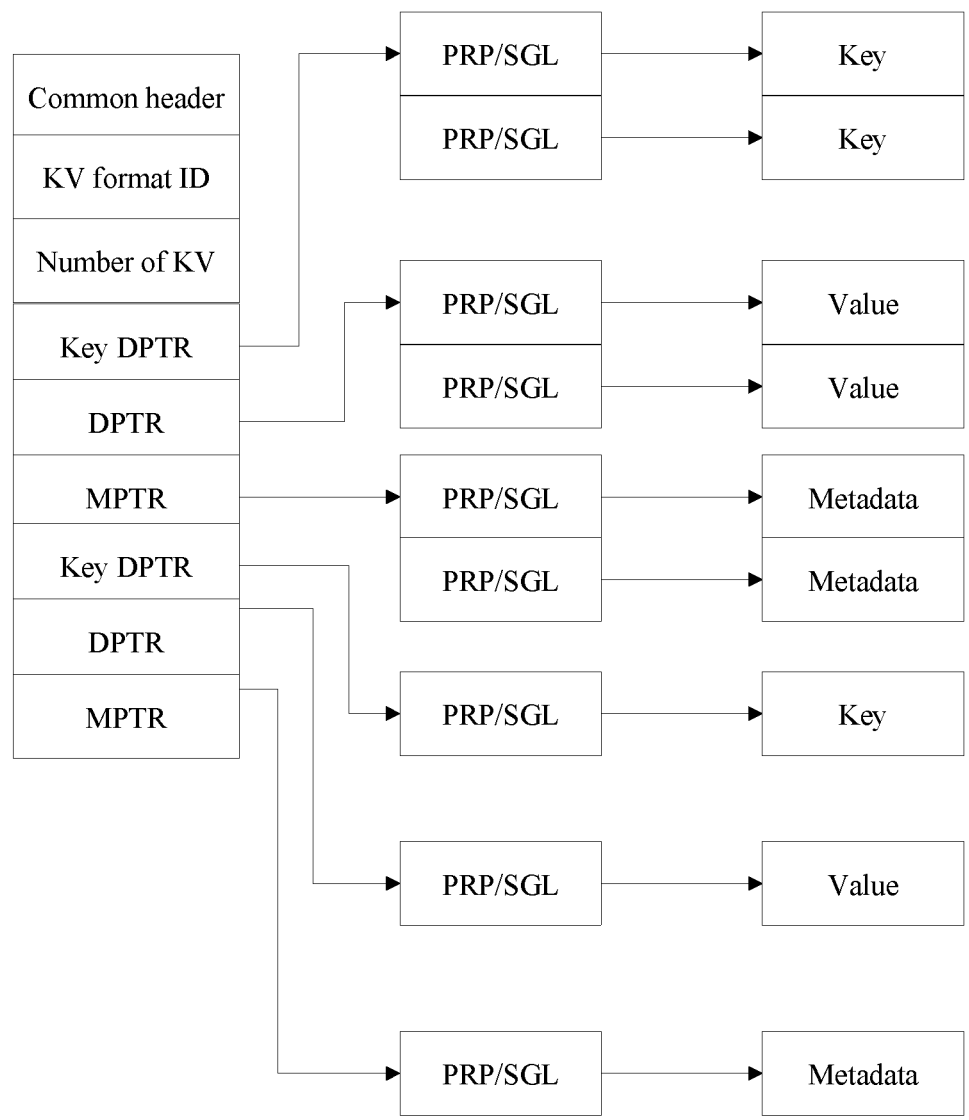
FIG. 11 is a schematic diagram of a command format.

Referring to FIG. 11, a difference between a command format in FIG. 11 and the command format in FIG. 10 is as follows: A key in FIG. 11 is not directly carried in a command, but transmitted in a pointer manner. For a specific carrying manner, refer to the description of the value pointer. A key pointer may be carried in the command header of the command.

Specifically, a DPTR points to a PRP/SGL entry 1, and a PRP/SGL entry 2 and the PRP/SGL entry 1 belong to a same linked list. Therefore, when the PRP/SGL entry 1 is found, the PRP/SGL entry 2 may be found. Therefore, it may be considered that the DPTR points to the PRP/SGL entry 1 and the PRP/SGL entry 2. The PRP/SGL entry 1 points to a value 1, and the PRP/SGL entry 2 points to a value 2. Similarly, an MPTR points to a PRP/SGL entry 3 and a PRP/SGL entry 4; the PRP/SGL entry 3 points to metadata 1; and the PRP/SGL entry 4 points to metadata 2. Value 1 storage space and value 2 storage space may be found by using the DPTR. Metadata 1 storage space and metadata 2 storage space may be found by using the MPTR. Both the PRP entry and the SGL entry are nodes in the linked list. The PRP is applicable to the ordinary NVMe (a host and a storage device are connected by using the PCIe), and the SGL is applicable to the NOF (a host and a storage device are connected by using the Fabric). The PRP may be used in RDMA, and the PRP or the SGL may be used in DMA.

The PRP transmits a location in which the data is located to an NVMe device by using a series of pointers pointing to a memory page. After receiving the addresses, the NVMe device may read the data from the host into the NVMe device in the DMA manner. Compared with the PRP, an SGL transmission mechanism is more flexible. A transmission data amount may be specified, and some address spaces can be skipped during a continuous address transmission process. The SGL transmits, to the NVMe device, an address of data that needs to be transmitted. After receiving the address, the NVMe device reads the data from the host into the NVMe device in the DMA manner.

In addition, compared with FIG. 9, FIG. 10 further adds a number of KV field and a key length field, which are already described in step 11 and step 12. Details are not described again.

Step 22: The storage device receives the write command by using an NVMe interface. The storage device obtains a value length by using the value pointer, allocates storage space (hereinafter also referred to as second storage space for ease of description) to the value according to the value length, and sends location information of the allocated storage space to the host. The storage device sends a transmission request (e.g., a first transmission request) to the host, and obtains the value from first storage space in the host. If the host and the storage device are connected by using the PCIe, the first transmission request may be a DMA transmission request, for example, a single DMA transmission request. If the host and the storage device are connected by using the Fabric, the first transmission request may be an RDMA transmission request, for example, a single RDMA transmission request. The first transmission request uses an address of the first storage space as an access address, and uses an address of the second storage space as a write address. In the first transmission request, the access address may be: a start address of the first storage space and the value length; and the write address may be: a start address of the second storage space (or a start address of the second storage space and the value length).

The storage device sends the DMA/RDMA transmission request to the host. After receiving the transmission request, the host performs DMA/RDMA transmission and sends the value to the storage device.

Pre-allocating the second storage space is optional. Alternatively, the storage device may not allocate the second storage space in advance, but directly obtains the value from the host, and then allocates the second storage space to the value. In this case, the first transmission request carries no write address.

If the write command carries a metadata pointer, storage space (e.g., a fourth storage space) is further allocated to metadata. Because a manner of processing the metadata pointer is similar to that of the value pointer, only the value pointer is described subsequently.

Before the value is obtained according to the value pointer, storage space (e.g., the second storage space) used to store the value is allocated in the storage device according to the value length. The second storage space is not less than the value length. The second storage space may be described by using the start address and an end address, may be described by using the start address and the value length, or may be described by using only the start address. The value length may be determined by the value storage space. For example, in the write command, the first storage space is described by using the start address of the space in which the value is stored and the value length, so that the value length may be directly obtained from the write command.

The storage device includes a controller and a storage medium. The controller includes a processor. For example, the storage medium is a flash memory or a magnetic disk.

A command header field, a KV format ID field, a key field, or a key length field are already described in step 12. Details about obtaining the fields and using the fields to obtain corresponding information are not described herein again.

Different from the embodiments described in steps 11 to 16, in this embodiment, the value and/or metadata are/is not directly obtained from the command. Instead, the value and/or metadata are/is obtained by using a pointer.

The value pointer carried in the write command directly points to the first storage space. For example, in the command format in FIG. 9, the pointer DPTR in the write command points to the value storage space (e.g., the first storage space). Specifically, the pointer DPTR points to a memory address range in the host, and the value is stored in the memory address range. The value is obtained from a host memory address according to the storage space described by the DPTR and in the DMA or RDMA manner. The metadata may be obtained in the same manner by using the MPTR.

If the value pointer in the write command indirectly points to the value, reference may be made to the format of the write command in FIG. 10: The value pointer directly points to another pointer, and the another pointer points to the value. The pointer DPTR in the write command points to the PRP/SGL entry; the PRP/SGL entry points to the host memory address; and the host memory address is the value storage space. The storage device first finds the PRP/SGL entry by using the DPTR; then finds, by using the PRP/SGL entry, the value storage space located in a host memory; and obtains the value from the host memory in the DMA or RDMA manner.

If the metadata pointer is carried in the write command, a manner of obtaining the metadata is the same as the manner of obtaining the value. If the metadata is directly carried in the write command, the metadata may be directly obtained from the write command by referring to step 12.

The storage device sends the first transmission request to the host, and obtains the value from the first storage space in the host. If the host and the storage device are connected by using the PCIe, the first transmission request may be the DMA transmission request. If the host and the storage device are connected by using the Fabric, the first transmission request may be the RDMA transmission request. Specifically, there may be two steps. (1) The storage device sends a transmission request to the host. The transmission request carries the first storage space as an access address, and carries the second storage space as a write address. Specifically, the first storage space carried in the transmission request may be described by using the start address of the first storage space and the value length; and the second storage space may be described by using the start address of the second storage space. (2) After receiving the transmission request, the host reads data from the first storage space, and sends the data to the second storage space in the storage device for storage.

In this step, the key, the value, and the metadata may be transmitted by means of a single DMA/RDMA transmission. Alternatively, the key, the value, and the metadata may be separately transmitted.

Step 23: The storage device stores the value. Specifically, a controller in the storage device stores the key and the value in a storage medium in the storage device. If the metadata is further obtained in step 22, the metadata is also stored.

For example, the value is stored in the storage medium in the storage device in a consecutive manner from the start address of the second storage space.

In addition, a mapping relationship between the key and the value storage space may be further recorded. Referring to FIG. 6, the value storage space in FIG. 6 is described by using the start address and the value length. The mapping relationship is recorded in a KV management unit. The value length and the metadata length are optional, because both the value and the metadata may have fixed lengths.

In steps 21 to 23, the value is transmitted in the pointer manner. In another embodiment, the key may also be transmitted in the pointer (e.g., a direct pointer or an indirect pointer) manner. For details, refer to the transmission manner of the value. Details are not described herein again.

The process of a write command is described in steps 21 to 23, and an execution process of a read command is described in steps 24 to 26. The two processes are independent of each other. The KV requested by a read command may be different from the KV written by using a write command. Command formats of a read command and a write command are similar, but a difference lies in that a read command carries neither a value pointer nor a metadata pointer.

24. A host generates a read command, and sends the read command to the storage device. The read command carries the key. The key may be carried in a command header of the read command.

The host generating the read command and the host generating the write command may be a same host, or may be different hosts. For a format of the read command, refer to the format of the write command in step 11 and FIG. 2. A read command includes a command header, a KV format ID, and a key. Optionally, a read command carries a key or a key pointer. A read command may carry one key, or may carry at least two keys. When carrying at least two keys, the read command may carry a number of KV field, so as to describe a quantity of carried keys.

The read command is used to request to read the value and/or the metadata.

Compared with the write command, the read command may include neither a value field nor value location information, and the read command may include neither a metadata field nor metadata location information.

25. The storage device receives the read command by using the NVMe interface, and obtains the key from the read command. The storage device searches, by using the obtained key, the mapping relationship stored in the storage device for the value storage space, and sends the value storage space to the host. The value storage space in the storage device is the second storage space.

Figure 12:
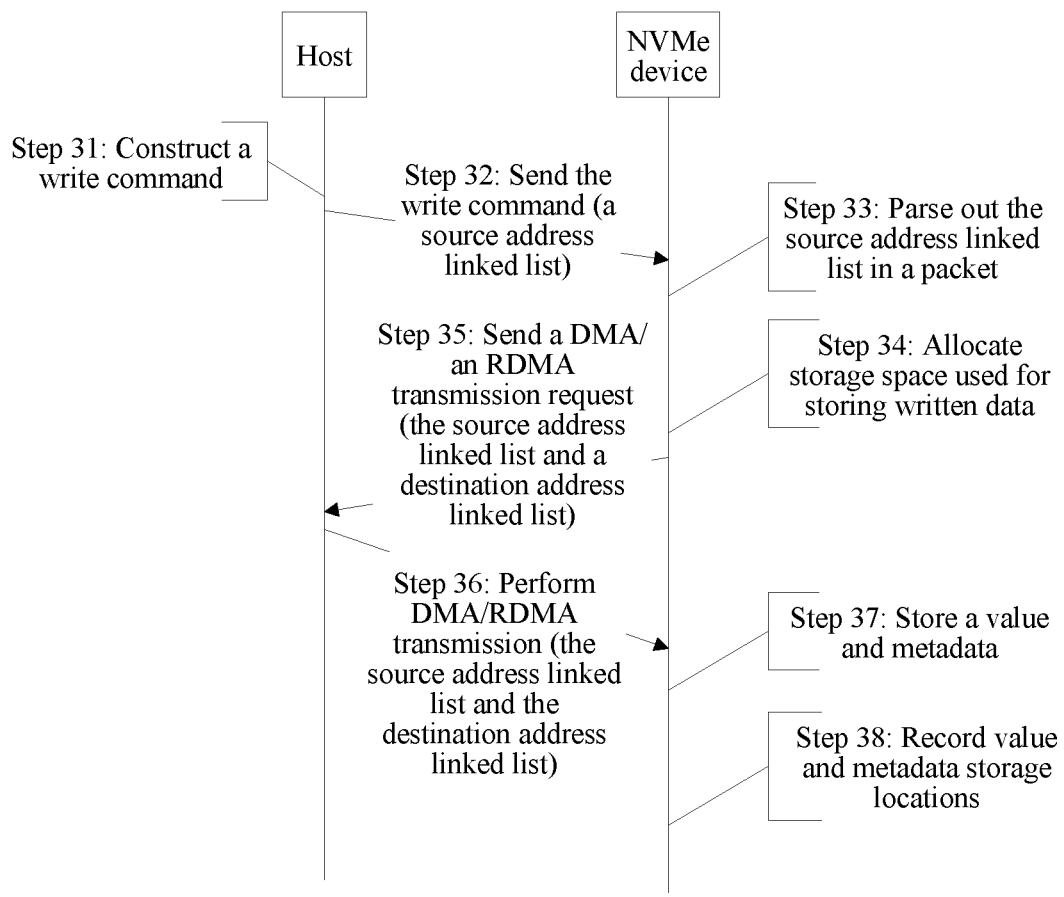
FIG. 12 is a flowchart of an embodiment of a method for writing data.

If the key is directly carried in the read command, referring to FIG. 12, according to different command formats, manners of obtaining the key from the read command are slightly different. For example, the key may be obtained from a fixed location in the read command; or if a location of the key in the read command is unfixed, the key may be obtained from the read command according to location information carried in the read command.

Optionally, if the storage device stores metadata corresponding to the key, metadata storage space may be further obtained and sent to the host.

26. The host allocates storage space (e.g., named third storage space) to the value according to the value length. The host constructs a transmission request (e.g., a second transmission request), sends the transmission request to the storage device, and obtains the value from the second storage space in the storage device.

If the host and the storage device are connected by using the PCIe, the second transmission request may be a DMA transmission request, for example, a single DMA transmission request; if the host and the storage device are connected by using the Fabric, the second transmission request may be an RDMA transmission request, for example, a single RDMA transmission request. In the transmission request, the access address may be: the start address of the second storage space and the value length; and the write address may be the start address of the third storage space (or the start address of the third storage space and the value length). It may be learned from the foregoing steps that the second storage space is used to store the value, and therefore the value length is the same as a size of the second storage space. That is, the size of the second storage space is equal to a size of the third storage space.

The value length may be determined by the value storage space. For example, in the read command, the second storage space is described by using the start address of the space in which the value is stored and the value length, so that the value length may be directly obtained from the read command.

The host sends the DMA/RDMA transmission request to the storage device. After receiving the transmission request, the storage device performs DMA/RDMA transmission and sends the value to the host.

Pre-allocating the third storage space is optional. Alternatively, the host may not pre-allocate the third storage space, but directly obtains the value from the storage device, and then allocates the third storage space to the value. In this case, the transmission request carries no write address.

Similarly, the host may allocate storage space to the metadata according to the metadata length, and obtains the metadata from the storage device.

27. The host stores the received value in the third storage space. For example, the value is stored in the host in a consecutive manner from a start address of the third storage space. For example, the third storage space is in a memory in the host.

The metadata is stored in the host by using a method similar to the method for storing the value in the host.

It should be noted that in another embodiment, DMA or RDMA may not be used, and steps 26 and 27 are modified as follows: The host allocates storage space to the value; and the storage device reads the value from the second storage space, and writes the read value into the third storage space.

In addition, another optional solution of step 26 is as follows: the NVMe read command that is received by the NVMe storage device and that is sent by the host may further carry free space information of the host. The free space information is used to describe a size of a contiguous free storage space in the host. After the NVMe storage device receives the NVMe read command from the host, the process further includes the following steps: The NVMe storage device determines whether free storage space in the host is greater than or equal to the second storage space. If the free storage space in the host is greater than or equal to the second storage space, perform the step of sending the location information of the second storage space to the host, or if the free storage space in the host is not greater than or equal to the second storage space, end the step. In this solution, the contiguous free storage space in the host may be referred to as third storage space.

Referring to FIG. 12, step 21 to step 23 are described by using an example in which a value pointer and a metadata pointer are carried in a same command.

Step 31: A host constructs a write command. The write command carries a key. In addition, the write command carries a value source address linked list and a metadata source address linked list. The source address linked list has a function of a pointer. The value source address linked list and the metadata source address linked list respectively point to value storage space and metadata storage space.

Step 32: The host sends the write command to an NVMe device.

Step 33: After receiving the write command, the NVMe device parses out the value source address linked list and the metadata source address linked list from the write command. For example, the linked list is a PRP entry or an SGL entry.

Step 34: The NVMe device parses out a value length from the value source address linked list, and parses out a metadata length from the metadata source address linked list. The source address linked lists describe storage space of to-be-read data, and therefore the value length and the metadata length may be parsed out from the source address linked lists.

Step 35: The NVMe device sends a DMA or an RDMA request to the host. The request carries the value source address linked list, the metadata source address linked list, a value destination address linked list, and a metadata destination address linked list. The value destination address linked list describes storage space that is reserved by the NVMe device and that is used to store the value. The metadata destination address linked list describes storage space that is reserved by the NVMe device and that is used to store the metadata.

Step 36: After receiving the DMA/RDMA request, the host sends the key to the NVMe device according to a source address and a destination address in step 35.

Step 37: The NVMe device stores the value and the metadata in a medium.

Step 38: The NVMe device records the value storage space and the metadata storage space. A mapping between the storage space and the key is established, so that the key is subsequently used to search for the value storage space and the metadata storage space. The mapping relationship may be stored in a KV management unit. The KV management unit may further record the value length and the metadata length.

In the foregoing steps, the key is directly carried in the command. In another implementation, the command may carry a key pointer instead of carrying a key. After receiving the command, the storage device obtains the key according to the key pointer. For a specific step of obtaining the key, refer to the process of obtaining the value in step 22. Because principles are similar, details are not described herein again.

Figure 13:
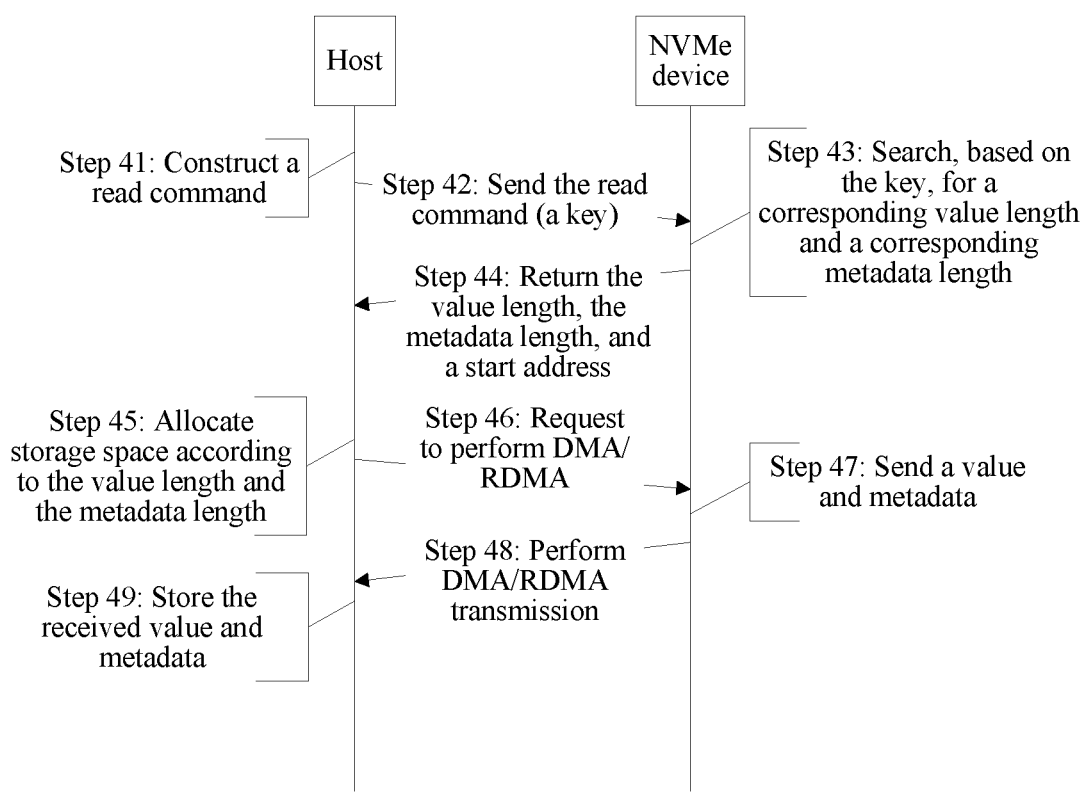
FIG. 13 is a flowchart of an embodiment of a method for reading data.

Referring to FIG. 13, step 24 to step 27 are described in detail by using an example in which a value pointer and a metadata pointer are carried in a same command.

Step 41: A host constructs a read command, where the read command carries a key.

Step 42: The host sends, to an NVMe device, the read command that carries the key.

Step 43: The NVMe device searches a KV management unit for a value length and a metadata length that are corresponding to the key. The KV management unit records value storage space and metadata storage space.

Using the value storage space as an example, the value is stored in the NVMe device. The value storage space is described by using a value start address and a value end address, or the start address and the value length. Therefore, after the value storage space is obtained, the value length may be obtained. Similarly, the metadata length may be obtained.

Step 44: The NVMe device sends a response message to the host, where the response message carries the value length and the metadata length.

Step 45: The host allocates, according to the value length and the metadata length, storage space to a value and metadata for subsequently storing the value and the metadata.

Step 46: The host sends a DMA/an RDMA request to the NVMe device. The request carries a source address and a destination address of a current transmission. The source address is the value storage space and the metadata storage space in the NVMe. The destination address is the storage space reserved by the host for the value, and the storage space reserved for the metadata.

Step 47: After receiving the DMA/RDMA request sent by the host, the NVMe device sends the value and the metadata according to the DMA/RDMA protocol.

Step 48: The host receives the value and the metadata.

Step 49: The host stores the received value and metadata. For example, the host stores the received value and metadata in a host memory.

DMA or RDMA is generally used for reading data of a contiguous address space. When the storage space in which the value in stored and the storage space in which the metadata is stored are noncontiguous, two DMA/RDMA transmissions may be performed.

Figure 14A:
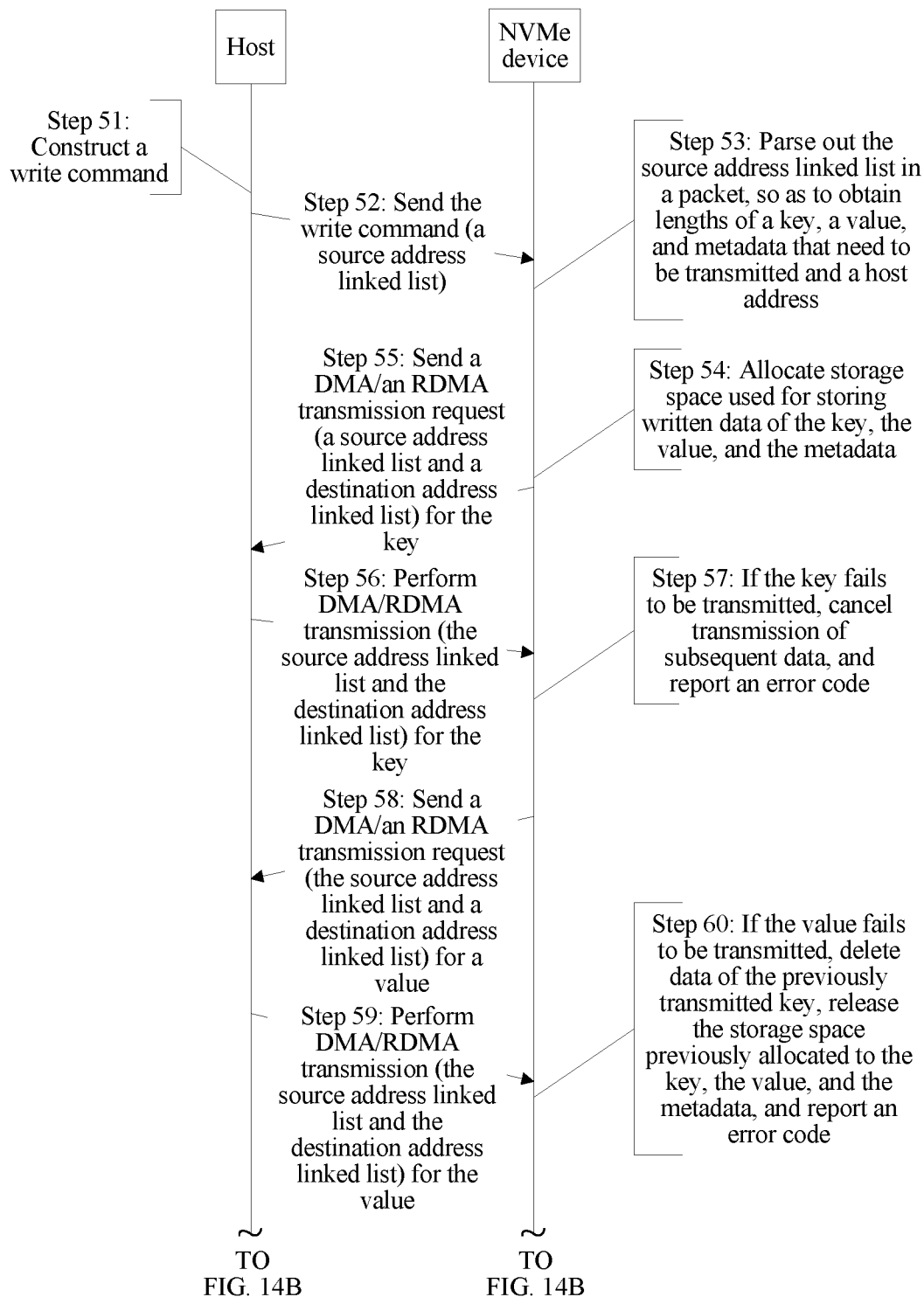
FIG. 14A and FIG. 14B are a flowchart of an embodiment of a method for writing data.
Figure 14B:
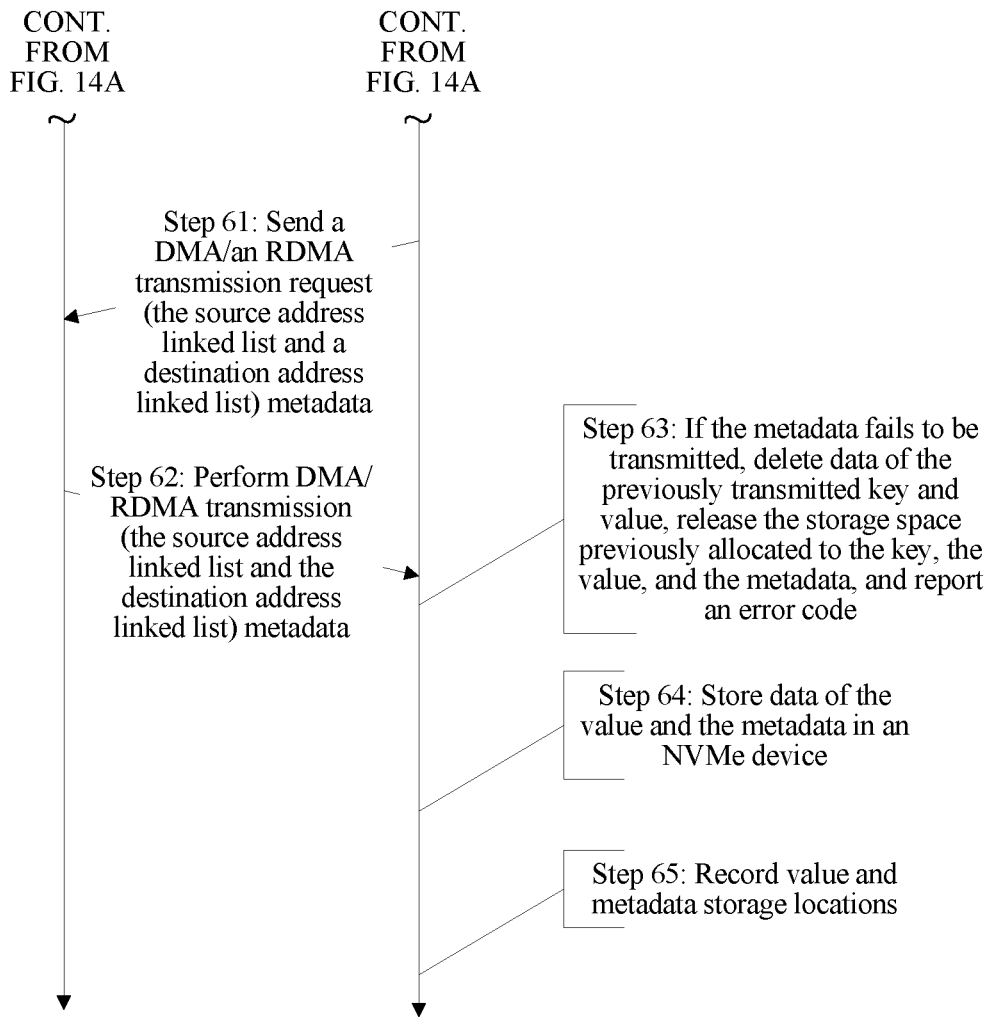

Referring to FIG. 14A and FIG. 14B, the present disclosure further provides an embodiment based on steps 21 to 23, so as to improve the embodiment based on FIG. 12. The improvement lies in that a key, a value, and metadata in a same command are separately obtained by performing three DMA/RDMA transmissions.

Optionally, if any one of the transmissions fails, it means that the KV transmission is unsuccessful, and consequently, data that is successfully transmitted may be deleted, an error code is uploaded, and subsequent data transmission is canceled. In addition, storage space previously allocated to a KV (a key, a value, and metadata) may be released.

Step 51: Construct an NVMe write command.

The write command carries a key. In addition, the write command carries a value source address linked list and a metadata source address linked list. The source address linked list has a function of a pointer. The value source address linked list and the metadata source address linked list respectively point to value storage space and metadata storage space.

Step 52: A host sends the write command to an NVMe device.

Step 53: After receiving the write command, the NVMe device parses out a value source address linked list and a metadata source address linked list from the write command. For example, the linked list is a PRP entry or an SGL entry.

Step 54: The NVMe device parses out a key length from a key source address linked list, parses out a value length from the value source address linked list, parses out a metadata length from the metadata source address linked list, and reserves storage space for the key, the value, and the metadata. The source address linked lists describe storage space of to-be-read data, and therefore the value length and the metadata length may be parsed out from the source address linked lists.

Step 55: The NVMe device sends a DMA/an RDMA request to the host. The request carries the key source address linked list and a key destination address linked list. The key destination address linked list describes the storage space that is reserved by the NVMe device and that is used to store the key.

Step 56: After receiving the DMA/RDMA request, the host sends the key to the NVMe device according to a source address and a destination address in step 55.

Step 57: If the key fails to be transmitted, the NVMe device cancels subsequent transmission of the value and metadata; optionally, releases the storage space reserved for the key, the value, and the metadata; and reports an error code to the host. If the key is successfully transmitted, proceed to subsequent step 58.

Step 58: The NVMe device sends a DMA/an RDMA request to the host. The request carries the value source address linked list and a value destination address linked list. The value destination address linked list describes the storage space that is reserved by the NVMe device and that is used to store the value.

Step 59: After receiving the DMA/RDMA request, the host sends the value to the NVMe device according to a source address and a destination address in step 58.

Step 60: If the value fails to be transmitted, the NVMe device cancels subsequent transmission of metadata; optionally, releases the storage space reserved for the value and the metadata; optionally, deletes the transmitted key; and reports an error code to the host. If the value is successfully transmitted, proceed to subsequent step 61.

Step 61: The NVMe device sends a DMA/an RDMA request to the host. The request carries the metadata source address linked list and a metadata destination address linked list. The metadata destination address linked list describes the storage space that is reserved by the NVMe device and that is used to store the metadata.

Step 62: After receiving the DMA/RDMA request, the host sends the metadata to the NVMe device according to a source address and a destination address in step 61.

Step 63: If the metadata fails to be transmitted, optionally, release the storage space reserved for the metadata; optionally, delete the transmitted key and value; and report an error code to the host. If the metadata is successfully transmitted, proceed to subsequent step 64.

Step 64: Store the value and the metadata in the storage device. The value and the metadata that are obtained in steps 60 and 63 are in a memory. In this step, the value and the metadata are stored in a non-volatile medium, for example, a hard disk on the NVMe device.

Step 65: Record the value storage space and the metadata storage space.

It may be learned from step 55 to step 63 in FIG. 14A and FIG. 14B that the key, the value, and the metadata are respectively obtained by means of different DMA transmissions. If any of the data items fails to be transmitted, transmission of remaining data is canceled, and successfully transmitted data may be deleted. The remaining steps in FIG. 14A and FIG. 14B are similar to those in FIG. 12, and are already described earlier. Details are not described herein again.

Similarly, the value and the metadata may be separately transmitted, and in addition, the value (or the metadata) may also be separately transmitted for multiple times, for example, one value is separately transmitted by performing at least two DMA/RDMA transmissions. If any transmission fails, it is determined that the overall KV transmission fails, and the storage space reserved for the key, the value, and the metadata are released. When the NVMe storage device and the host are connected by using a PCIe bus, the storage device sends at least two DMA transmission requests to the host to obtain the value. A part of the value is obtained during each DMA transmission. When the NVMe storage device and the host are connected by using the Fabric, the storage device sends at least two RDMA transmission requests to the host to obtain the value. A part of the value is obtained during each RDMA transmission.

The solution in which the value (or the metadata) is separately transmitted for multiple times and the solution in which the value and the metadata are separately transmitted and that is described in step 55 to step 63 may be combined for use. In this case, if any transmission fails (or a transmission request fails to be executed), it is determined that the overall KV transmission fails, and the storage space reserved for the key, the value, and the metadata are released.

A process in FIG. 14A and FIG. 14B describes a manner of processing a write command. An initiator of a DMA/an RDMA transmission request is an NVMe device. Similarly, a similar solution may also be used in a process of processing a read command, and a key, a value, and metadata are respectively obtained by means of different DMA transmissions. A difference lies in that an initiator of a transmission request is a host, and the NVMe device transmits the key, the value, and the metadata by means of DMA/RDMA.

Figure 15:
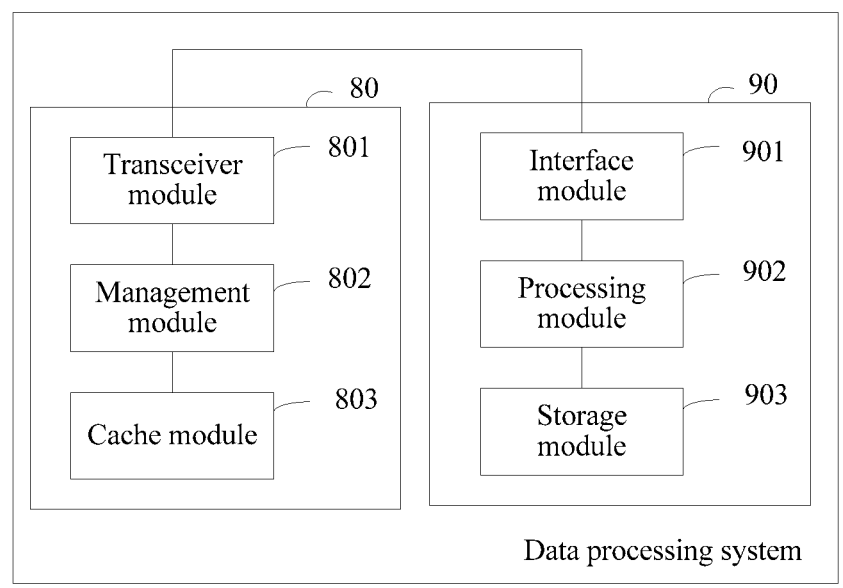
FIG. 15 is a diagram of a logical function of an embodiment of a data processing system.

Referring to FIG. 15, the present disclosure provides a data processing system, including a host apparatus 80 and a storage apparatus 90. The host apparatus 80 and the storage apparatus 90 are connected by using the PCIe or the Fabric. The host apparatus 80 may read KV data from or write KV data into the storage apparatus 90.

The host apparatus 80 may be a physical device or a logical apparatus, and includes a transceiver module 801, a management module 802, and a cache module 803. The storage apparatus 90 may be a physical device or a logical apparatus, and includes an interface module 901, a processing module 902, and a storage module 903. The transceiver module 801 and the interface module 901 communicate with each other. The host apparatus 80 has functions of the foregoing host, and the storage apparatus 90 has functions of the foregoing storage device.

The following briefly describes functions of the host apparatus 80 and the storage apparatus 90. It should be noted that because the functions of the two apparatuses (and corresponding modules) are described in detail in the method process, only a brief description is given herein.

The storage apparatus 90 includes the interface module 901, the processing module 902, and the storage module 903. The interface module 901 is configured to receive an NVMe write command sent by a host, where the NVMe write command carries a key, the NVMe write command carries a value pointer, the value pointer points to first storage space in the host, the first storage space is used to store a value, and the key and the value belong to a same KV pair. The processing module 902 is configured to: obtain the key from the NVMe write command, obtain a value length according to the value pointer, and allocate second storage space to the value according to the value length. The storage module 903 is configured to: send a first transmission request to the host, obtain the value from the host, and store the value in the second storage space. The second storage space may be provided by a storage medium in the NVMe storage device. The storage medium is connected to a processor in the NVMe storage device. Based on this solution, in a process of transmitting KV data from the host to the NVMe storage device, the KV data does not need to be converted into a block form, so that KV data storage efficiency is improved.

Alternatively, the storage apparatus 90 includes the interface module 901, the processing module 902, and the storage module 903. The interface module 901 is configured to receive an NVMe write command, where a header of the NVMe write command carries a key key, the NVMe command further carries a value value, the key is corresponding to the value, and the key and the value belong to a same KV pair. The processing module 902 is configured to obtain the key and the value from the NVMe write command. The storage module 903 is configured to store the value in the storage medium in the NVMe storage device.

In an implementation, the host apparatus 80 includes the transceiver module 801, the management module 802, and the cache module 803. The transceiver module 801 is configured to send an NVMe read command to the storage apparatus 90, where the NVMe command carries a key. The transceiver module 801 is further configured to receive a response message of the NVMe read command from the NVMe storage device, where the response message carries location information of the second storage space. The management module 802 is configured to reserve third storage space for the value according to a value length in the value location information. The transceiver module 801 is further configured to: send a transmission request to the NVMe storage device, where an access address of the transmission request is the second storage space, and obtain the value from the NVMe storage device. The cache module 803 stores the value in the third storage space in the host apparatus 80. Based on this module structure, the host apparatus may read the value and the metadata in the storage apparatus.

In combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementations of the present invention, but are not intended to limit the protection scope of the present invention. Any variation or replacement based on the present invention shall fall within the protection scope of the present invention. Therefore, the protection scope of the present invention shall be subject to the protection scope of the claims.

What is claimed is:

1. A data processing method implemented by a non-volatile memory express (NVMe) storage device, the method comprising:
   receiving an NVMe command sent by a host, wherein the NVMe command indicates to store a value in the NVMe storage device, the NVMe command carries a key (K) and a value (V) identifier of the value, and the key and the value belong to the same key value pair;
   obtaining the value based on the pointer of the value, wherein the value identifier comprises a pointer of the value and the pointer indicates a storage location of the value; or, obtaining the value based on the NVMe command, wherein the value identifier comprises the value;
   identifying a storage space for the value according to the value length in the NVMe storage device, wherein the value identifier further comprises a length of the value; and
   storing the value in the storage space in the NVMe storage device.

2. The data processing method of claim 1, wherein the method further comprises:
   recording a correspondence between K and V in a KV mapping relationship in the NVMe storage device, wherein the correspondence between K and V comprises a matching relationship between K and V.

3. A data processing method implemented by a non-volatile memory express (NVMe) storage device, the method comprising:
receiving a first NVMe command sent by a first host, wherein the first NVMe command indicates to store a value in the NVMe storage device, the first NVMe command carries a key (K) and a value (V) identifier of the value, and the key and the value belong to the same key value pair;
obtaining the value based on the pointer of the value, wherein the value identifier comprises a pointer of the value and the pointer indicates a storage location of the value; or, obtaining the value based on the first NVMe command, wherein the value identifier comprises the value, and wherein obtaining, based on the value identifier;
identifying a storage space for the value according to the value length in the NVMe storage device, wherein the value identifier further comprises a length of the value;
storing the value in the storage space in the NVMe storage device;
receiving a second NVMe command sent by a second host, wherein the second NVMe command indicates to read the value in the NVMe storage device, the second NVMe command carries the key and the value identifier of the value, and the key and the value belong to the same key value pair;
obtaining the value based on the value identifier; and
sending the value to the second host.

4. A non-volatile memory express (NVMe) storage device, comprising a controller and a storage medium, wherein the controller is connected to the storage medium, and the storage medium is configured to provide storage space, wherein the controller is configured to:
receive an NVMe command sent by a host, wherein the NVMe command indicates to store a value in the NVMe storage device, the NVMe command carries a key (K) and a value (V) identifier of the value, and the key and the value belong to the same key value pair;
obtain the value based on the pointer of the value, wherein the value identifier comprises a pointer of the value and the pointer indicates a storage location of the value; or, obtain the value based on the NVMe command, wherein the value identifier comprises the value;
identify a storage space for the value according to the value length in the NVMe storage device, wherein the value identifier further comprises a length of the value; and
store the value in the storage space in the NVMe storage device.

5. The NVMe storage device of claim 4, wherein the controller is configured to:
record a correspondence between K and V in a KV mapping relationship in the NVMe storage device, wherein the correspondence between K and V comprises a matching relationship between K and V.

6. A non-volatile memory express (NVMe) storage device, comprising a controller and a storage medium, wherein the controller is connected to the storage medium, and the storage medium is configured to provide storage space, wherein the controller is configured to:
receive a first NVMe command sent by a host, wherein the first NVMe command indicates to store a value in the NVMe storage device, the first NVMe command carries a key (K) and a value (V) identifier of the value, and the key and the value belong to the same key value pair;
obtain the value based on the pointer of the value, wherein the value identifier comprises a pointer of the value and the pointer indicates a storage location of the value; or, obtain the value based on the first NVMe command, wherein the value identifier comprises the value;
identify a storage space for the value according to the value length in the NVMe storage device, wherein the value identifier further comprises a length of the value; and
store the value in the storage space in the NVMe storage device;
receive a second NVMe command sent by a second host, wherein the second NVMe command indicates to read the value in the NVMe storage device, the NVMe command carries the key and the value identifier of the value, and the key and the value belong to the same key value pair;
obtain, based on the value identifier, the value; and
send the value to the second host.

7. A storage system, wherein the system comprises a host and a non-volatile memory express (NVMe) storage device, wherein the NVMe storage device comprises a controller and a storage medium, wherein the controller is connected to the storage medium, and the storage medium is configured to provide storage space, wherein:
the host is configured to send a NVMe command, wherein the NVMe command indicates to store a value in the NVMe storage device, the NVMe command carries a key (K) and a value (V) identifier of the value, and the key and the value belong to the same key value pair; and
the controller is configured to:
receive the NVMe command;
obtain the value based on the pointer of the value, wherein the value identifier comprises a pointer of the value and the pointer indicates a storage location of the value; identify a storage space for the value based on the value length in the NVMe storage device, wherein the value identifier further comprises a length of the value; or, obtain the value based on the NVMe command;
identify a storage space for the value based on the value length in the NVMe storage device; and
store the value in the storage space in the NVMe storage device.

8. The storage system of claim 7, wherein:
the controller is further configured to record a correspondence between K and V in a KV mapping relationship in the NVMe storage device, and
the correspondence between K and V comprises a matching relationship between K and V.

9. The storage system of claim 7, wherein the controller is further configured to:
receive an NVMe command sent by a host, wherein the NVMe command indicates to read a value in the NVMe storage device, the NVMe command carries a key and a value identifier of the value, and the key and the value belong to the same key value pair;
obtain, based on the value identifier, the value; and
send the value to the host.

10. A non-transitory computer-readable storage medium comprising instructions that, responsive to being executed by a computer, cause the computer to:
receive an NVMe command sent by a host, wherein the NVMe command indicates to store a value in the NVMe storage device, the NVMe command carries a key (K) and a value (V) identifier of the value, and the key and the value belong to the same key value pair;

obtain the value based on the pointer of the value, wherein the value identifier comprises a pointer of the value and the pointer indicates a storage location of the value; or, obtain the value based on the NVMe command, wherein the value identifier comprises the value identify a storage space for the value according to the value length in the NVMe storage device, wherein the value identifier further comprises a length of the value; and store the value in the storage space in the NVMe storage device.

11. A non-transitory computer-readable storage medium comprising instructions that, responsive to being executed by a computer, cause the computer to:

receive an first NVMe command sent by a first host, wherein the first NVMe command indicates to store a value in the NVMe storage device, the first NVMe command carries a key (K) and a value (V) identifier of the value, and the key and the value belong to the same key value pair;

obtain the value based on the pointer of the value, wherein the value identifier comprises a pointer of the value and the pointer indicates a storage location of the value; or, obtain the value based on the first NVMe command, wherein the value identifier comprises the value;

identify a storage space for the value according to the value length in the NVMe storage device, wherein the value identifier further comprises a length of the value; and store the value in the storage space in the NVMe storage device;

receive a second NVMe command sent by a second host, wherein the second NVMe command indicates to read the value in the NVMe storage device, the NVMe command carries the key and the value identifier of the value, and the key and the value belong to the same key value pair;

obtain, based on the value identifier, the value; and send the value to the second host.

\* \* \* \* \*